US009920844B2

(12) United States Patent
Leeser et al.

(10) Patent No.: US 9,920,844 B2
(45) Date of Patent: Mar. 20, 2018

(54) VALVE MANIFOLD DEADLEG ELIMINATION VIA REENTRANT FLOW PATH

(71) Applicant: LAM RESEARCH CORPORATION, Fremont, CA (US)

(72) Inventors: Karl Leeser, Lake Oswego, OR (US); Saangrut Sangplung, Sherwood, OR (US); Shankar Swaminathan, Beaverton, OR (US); Frank Pasquale, Tualiatin, OR (US); Chloe Baldasseroni, Portland, OR (US); Ted Minshall, Sherwood, OR (US); Adrien LaVoie, Newberg, OR (US)

(73) Assignee: LAM RESEARCH CORPORATION, Fremont, CA (US)

( * ) Notice: Subject to any disclaimer, the term of this patent is extended or adjusted under 35 U.S.C. 154(b) by 132 days.

(21) Appl. No.: 14/805,807

(22) Filed: Jul. 22, 2015

(65) Prior Publication Data
US 2016/0147234 A1 May 26, 2016

Related U.S. Application Data

(60) Provisional application No. 62/084,856, filed on Nov. 26, 2014, provisional application No. 62/192,859, filed on Jul. 15, 2015.

(51) Int. Cl.
*F16K 7/12* (2006.01)
*F16K 7/14* (2006.01)
(Continued)

(52) U.S. Cl.
CPC .............. *F16K 7/17* (2013.01); *B08B 9/0328* (2013.01); *F16K 7/123* (2013.01); *F16K 27/003* (2013.01);
(Continued)

(58) Field of Classification Search
CPC ... F16K 7/00; F16K 7/12; F16K 7/123; F16K 7/14; F16K 7/16; F16K 7/20;
(Continued)

(56) References Cited

U.S. PATENT DOCUMENTS 2,584,436 A * 2/1952 Donaldson .............. F16K 24/02
137/218
2,758,877 A * 8/1956 Gleason ............... A01C 23/042
137/268

(Continued)

OTHER PUBLICATIONS

U.S. Appl. No. 14/805,852, filed Jul. 22, 2015, Chandrasekharan et al.

*Primary Examiner* — Mary McManmon
*Assistant Examiner* — Hailey K Do

(57) ABSTRACT

A gas delivery system for a substrate processing system includes first and second valves, a first gas channel, and a cylinder. The first valve includes a first inlet and a first outlet. The first outlet is in fluid communication with a processing chamber of the substrate processing system. The second valve includes a second inlet and a second outlet. The cylinder defines a second gas channel having a first end and a second end. The cylinder is at least partially disposed within the first gas channel such that the cylinder and the first gas channel collectively define a flow channel. The flow channel is in fluid communication with the first end of the second gas channel and with the first inlet. A third gas channel is in fluid communication with the second end of the second gas channel and with the second inlet.

34 Claims, 15 Drawing Sheets

(51) Int. Cl.
*F16K 7/16* (2006.01)
*F16K 7/20* (2006.01)
*B08B 9/032* (2006.01)
*F16K 7/17* (2006.01)
*F16K 27/00* (2006.01)
*F16K 27/02* (2006.01)

(52) U.S. Cl.
CPC ............ *F16K 27/0236* (2013.01); *F16K 7/14* (2013.01); *F16K 7/16* (2013.01); *F16K 7/20* (2013.01); *Y10T 137/87249* (2015.04); *Y10T 137/87788* (2015.04); *Y10T 137/87877* (2015.04); *Y10T 137/87885* (2015.04); *Y10T 137/87917* (2015.04)

(58) Field of Classification Search
CPC ....... Y10T 137/6606; Y10T 137/87249; Y10T 137/877; Y10T 137/87788; Y10T 137/87877; Y10T 137/87885; Y10T 137/87917; B08B 9/0328
USPC ...... 251/331, 335.1, 335.2, 367; 137/565.26, 137/861, 872, 883, 884, 613
See application file for complete search history.

(56) References Cited

U.S. PATENT DOCUMENTS

| | | | |
|---|---|---|---|
| 4,232,063 A | 11/1980 | Rosler et al. | |
| 4,243,070 A * | 1/1981 | Jackson | F16K 17/0453 |
| | | | 137/510 |
| 4,315,479 A | 2/1982 | Toole et al. | |
| 4,660,598 A * | 4/1987 | Butterfield | F16K 7/14 |
| | | | 137/510 |
| 4,751,192 A | 6/1988 | Hirooka et al. | |
| 4,761,269 A | 8/1988 | Conger et al. | |
| 4,793,283 A | 12/1988 | Sarkozy | |
| 4,798,166 A | 1/1989 | Hirooka et al. | |
| 4,822,636 A | 4/1989 | Saitoh et al. | |
| 5,273,609 A | 12/1993 | Moslehi | |
| 5,328,558 A | 7/1994 | Kawamura | |
| 5,391,232 A | 2/1995 | Kanai et al. | |
| 5,620,559 A | 4/1997 | Kikuchi | |
| 5,900,214 A * | 5/1999 | Girard | F16K 7/16 |
| | | | 137/597 |
| 5,939,831 A | 8/1999 | Fong et al. | |
| 5,956,859 A | 9/1999 | Matsumoto et al. | |
| 6,102,071 A * | 8/2000 | Walton | G05D 16/0633 |
| | | | 137/540 |
| 6,167,323 A | 12/2000 | Komino et al. | |
| 6,190,460 B1 | 2/2001 | Hwang | |
| 6,329,297 B1 | 12/2001 | Balish et al. | |
| 6,511,539 B1 | 1/2003 | Raaijmakers | |
| 6,981,517 B2 * | 1/2006 | Snijders | B01J 4/02 |
| | | | 137/597 |
| 7,017,514 B1 | 3/2006 | Shepherd, Jr. et al. | |
| 7,204,886 B2 | 4/2007 | Chen et al. | |
| 7,389,792 B2 * | 6/2008 | Newberg | F16K 41/103 |
| | | | 137/240 |
| 7,402,210 B2 | 7/2008 | Chen et al. | |
| 7,452,423 B2 | 11/2008 | Kim et al. | |
| 7,591,907 B2 | 9/2009 | Chen et al. | |
| 7,780,785 B2 | 8/2010 | Chen et al. | |
| 8,070,879 B2 | 12/2011 | Chen et al. | |
| 8,210,203 B2 * | 7/2012 | DeVries | E03C 1/02 |
| | | | 137/597 |
| 8,291,857 B2 | 10/2012 | Lam et al. | |
| 8,304,021 B2 | 11/2012 | Yamamoto et al. | |
| 8,460,468 B2 | 6/2013 | Piechulla et al. | |
| 8,721,790 B2 | 5/2014 | Kato et al. | |
| 9,053,909 B2 | 6/2015 | Kato et al. | |
| 9,127,358 B2 | 9/2015 | Inoue et al. | |
| 9,163,311 B2 | 10/2015 | Hasegawa et al. | |
| 9,449,859 B2 | 9/2016 | Song | |
| 2002/0020429 A1 | 2/2002 | Selbrede et al. | |
| 2004/0266175 A1 | 12/2004 | Chen et al. | |
| 2005/0092245 A1 | 5/2005 | Moon et al. | |
| 2006/0060253 A1 * | 3/2006 | Yoshida | F16K 27/003 |
| | | | 137/884 |
| 2007/0281106 A1 | 12/2007 | Lubomirsky et al. | |
| 2008/0292430 A1 | 11/2008 | Piechulla et al. | |
| 2009/0241834 A1 | 10/2009 | Kato | |
| 2009/0250126 A1 | 10/2009 | Koyomogi | |
| 2010/0055347 A1 | 3/2010 | Kato et al. | |
| 2011/0008955 A1 | 1/2011 | Horii et al. | |
| 2012/0064698 A1 | 3/2012 | Olgado | |
| 2012/0160169 A1 | 6/2012 | Hasegawa et al. | |
| 2012/0180719 A1 | 7/2012 | Inoue et al. | |
| 2012/0180727 A1 | 7/2012 | Hasegawa et al. | |
| 2013/0146095 A1 * | 6/2013 | Avoyan | B08B 9/0328 |
| | | | 134/22.12 |
| 2013/0312663 A1 * | 11/2013 | Khosla | C23C 16/4485 |
| | | | 118/710 |
| 2013/0333768 A1 | 12/2013 | Chandrasekharan et al. | |
| 2014/0182515 A1 | 7/2014 | Yamazaki et al. | |
| 2014/0339330 A1 | 11/2014 | Hong et al. | |
| 2015/0086722 A1 | 3/2015 | Gandikota et al. | |
| 2016/0147234 A1 | 5/2016 | Leeser et al. | |
| 2017/0016115 A1 | 1/2017 | Chandrasekharan et al. | |

\* cited by examiner

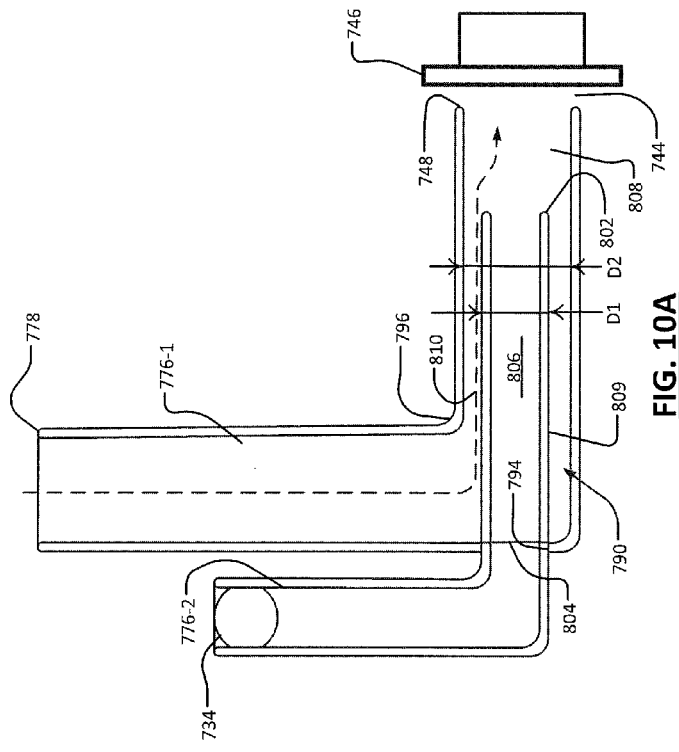
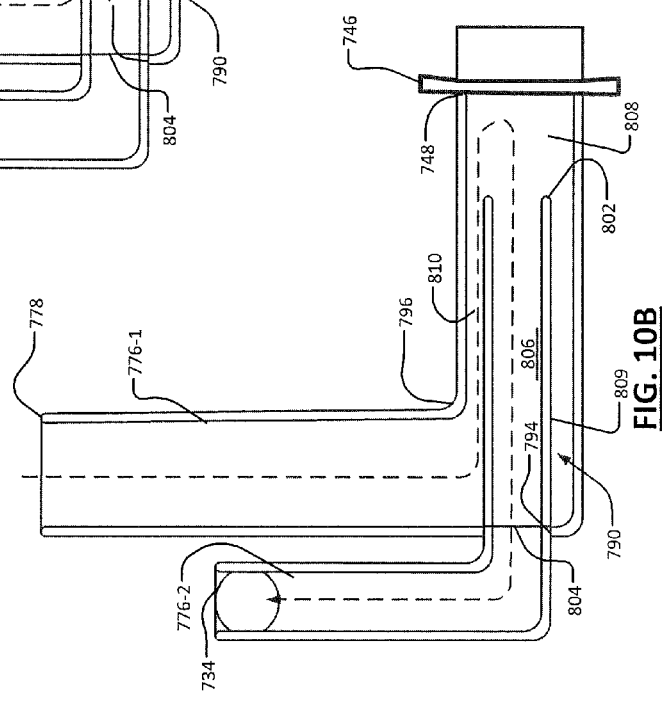

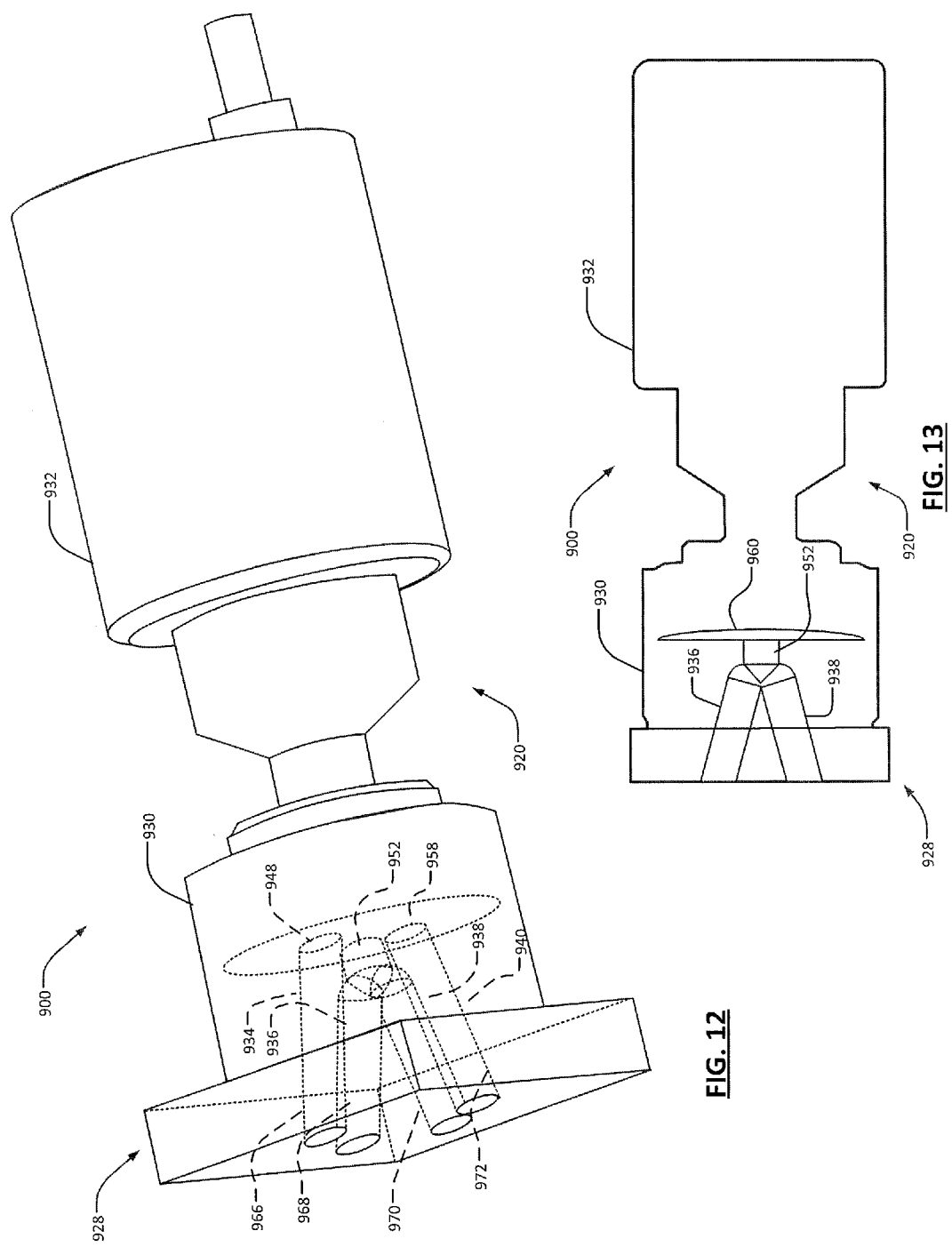

VALVE MANIFOLD DEADLEG ELIMINATION VIA REENTRANT FLOW PATH

CROSS-REFERENCE TO RELATED APPLICATIONS

This application claims the benefit of U.S. Provisional Application No. 62/084,856, filed on Nov. 26, 2014 and U.S. Provisional Application No. 62/192,859, filed Jul. 15, 2015. The entire disclosure of the application referenced above is incorporated herein by reference.

FIELD

The present disclosure relates to substrate processing systems, and more particularly to delivery of gas to a substrate processing system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Substrate processing systems for performing deposition and/or etching typically include a processing chamber with a pedestal. A substrate such as a semiconductor wafer may be arranged on the pedestal during processing. In chemical vapor deposition (CVD) or atomic layer deposition (ALD) processes, a gas mixture including one or more precursors may be introduced into the processing chamber to deposit film on the substrate or to etch the substrate. In some substrate processing systems, radio frequency (RF) plasma may be used to activate chemical reactions. CVD and ALD systems using plasma are called plasma-enhanced CVD (PECVD) and plasma-enhanced ALD (PEALD).

One consequence of almost any deposition process is that undesirable deposition occurs on interior surfaces of the processing chamber and creates film residue. The film residue can build up over time and may dissolve, detach or otherwise disperse in the processing chamber during substrate processing, which increases defects. To prevent this from occurring, the film residue is periodically removed using remote plasma clean (RPC) gas to avoid subsequent contamination.

Referring now to FIG. 1, a gas delivery assembly 10 is shown to include an elbow connector 20 having a body 21 defining a first gas channel 24 having an inlet and an outlet. The body 21 also defines a second gas channel 25 having an inlet and an outlet. The outlet of the first gas channel 24 is connected to a middle portion of the second gas channel 25 (at a junction 26). In use, gas such as vaporized precursor gas, purge gas and/or other gases flow from the inlet of the first gas channel 24 to the junction 26 and from the junction 26 through a lower portion of the second gas channel 25 (as shown by path 27) to a gas distribution device such as a showerhead (not shown).

The inlet of the second gas channel 25 is connected to a remote plasma clean (RPC) valve assembly 36 including a body 37. A valve member 38 is arranged in a valve chamber 39 of the body 37. During cleaning, RPC gas is supplied at 42 through a connector 50 to an inlet opening 54 of the valve chamber 39. If the valve member 38 is located in an open position, the RPC gas flows to a gas channel 56 that is connected to the inlet of the second gas channel 25 of the elbow connector 20 and then to the gas distribution device.

When gas is being supplied along the path 27 and the valve member 38 is in a closed position, the gas delivery assembly 10 has a dead-leg volume 60 located in the gas channel 56 and the upper portion of the second gas channel 25. The dead-leg volume 60 may trap vaporized precursor gas. The stagnant flow in the dead-leg volume may condense into particles that may fall onto the substrate, which increases defects.

Referring now to FIG. 8, another gas delivery assembly 600 is shown to include one or more valve assemblies 620-1, 620-2 ... and 620-N (collectively valve assemblies 620) and a valve manifold 628. The valve assemblies 620 are configured to control the flow of fluid(s) into and out of the valve manifold 628. In this regard, the valve manifold 628 includes a body 674 defining one or more gas channels 676-1, 676-2 ... and 676-N (collectively gas channels 676), first, second and third inlets 678, 680, 682, and first and second outlets 684, 685.

A first gas channel 676-1 extends from, and fluidly communicates with, the first inlet 678 of the valve manifold 628 and the second valve assembly 620-2. A second gas channel 676-2 extends from the first gas channel 676-1 to the first valve assembly 620-1. A third gas channel 676-3 extends from the first valve assembly 620-1 to the first outlet 684 of the valve manifold 628. A fourth gas channel 676-4 extends from the second valve assembly 620-2 to the second outlet 685 of the valve manifold 628.

The gas delivery assembly 600 is operated in at least three modes, such as a divert mode, a supply mode, and a standby mode. The gas delivery assembly 600 may operate in a continuous cycle such that the divert mode precedes the supply mode, the supply mode precedes the standby mode, and the standby mode precedes the divert mode. In the divert mode, stale precursor in the gas channels 676 may be replaced with fresh precursor. In the supply mode, vaporized precursor is supplied to the processing chamber. In the standby mode, vaporized precursor is not supplied and is not diverted.

When supplying vaporized precursor, the first valve assembly 620-1 is closed and the second valve assembly 620-2 is open. The vaporized precursor gas is supplied through the first gas channel 676-1 from the first inlet 678 to the second valve assembly 620-2. The vaporized precursor gas flows through the second valve assembly 620-2 and the fourth gas channel 676-4 to the processing chamber or other portion of the substrate processing system.

During the standby mode, the first and second valve assemblies 620-1, 620-2 are closed such that flow of vaporized precursor from the first inlet 678 is prevented. Accordingly, during the standby mode, vaporized precursor gas remains in the first gas channel 676-1. In some conditions, the stagnant vaporized precursor in the first gas channel 676-1 may condense into particles. Stagnant vaporized precursor that later enters the processing chamber can cause defects.

Prior to supplying vaporized precursor to the processing chamber in the supply mode, the vaporized precursor is diverted and discarded such that the stale vaporized precursor in the gas channel 676-1 is replaced by fresh precursor. When diverting the vaporized precursor, the first valve assembly 620-1 is open and the second valve assembly 620-2 is closed. When vaporized precursor gas is supplied through the first gas channel 676-1 from the first inlet 678, the vaporized precursor gas flows out of the valve manifold 628 through the second gas channel 676-2, the first valve assembly 620-1 and the third gas channel 676-3.

While the divert mode provides some improvement, not all of the stale vaporized precursor is removed. The gas delivery assembly 600 has a dead-leg volume 690 that is located downstream from the second gas channel 676-2 and upstream from the second valve assembly 620-2. Specifically, the vaporized precursor that stagnates in the dead-leg volume during the standby mode is not diverted through the first valve assembly 620-1 during the divert mode. Vaporized precursor that was trapped in the dead-leg volume 690 during the divert mode still flows into the processing chamber from the first and fourth gas channels 676-1, 676-4 during the supply mode and creates defects in the substrate.

SUMMARY

A gas delivery system for a substrate processing system includes a first gas channel. A cylinder defines a second gas channel having a first end and a second end. The cylinder at least partially disposed within the first gas channel such that the cylinder and the first gas channel collectively define a flow channel between an outer surface of the cylinder and an inner surface of the first gas channel. The flow channel is in fluid communication with the first end of the second gas channel. A third gas channel is in fluid communication with the second end of the second gas channel.

In other features, a first valve has an inlet and an outlet. The outlet of the first valve is in fluid communication with a processing chamber of the substrate processing system. A second valve has an inlet and an outlet. The first gas channel is in fluid communication with a gas supply. The flow channel is in fluid communication with the inlet of the first valve. The third gas channel is in fluid communication with the inlet of the second valve.

In some configurations, the gas supply includes a source of vaporized precursor.

In some configurations, the second valve is operable to divert a flow of fluid away from the inlet of the first valve.

In some configurations, the gas delivery system includes a controller configured to open and close the first and second valves.

In some configurations, the controller is configured to close the first valve and open the second valve in a first mode of operation.

In some configurations, the controller is configured to open the first valve and close the second valve in a second mode of operation.

In some configurations, the controller is configured to close the first and second valves in a third mode of operation.

In some configurations, the first gas channel includes a port sealingly engaged with the cylinder.

In some configurations, the first valve includes a valve seat, and the first end of the second gas channel is disposed upstream of the valve seat and downstream of the port.

In some configurations, the cylinder is concentrically disposed within the first gas channel.

In some configurations, the gas delivery system includes a heater configured to heat the flow channel.

In some configurations, the outer surface of the cylinder includes first and second radially outwardly extending projections defining a gap in fluid communication with the first and second gas channels.

In some configurations, the gas delivery system includes a controller configured to operate in a standby mode, where the first and second valves prevent a vaporized precursor from flowing through the first and second valves.

In some configurations, the gas delivery system includes a controller configured to operate in a divert mode, where the first and second valves direct the vaporized precursor through the second and third gas channels and the second valve.

In some configurations, the gas delivery system includes a controller configured to operate in a supply mode, where the first and second valves direct the vaporized precursor through the first gas channel and the first valve.

In some configurations, the gas delivery system includes a controller configured to close the first and second valves to prevent a vaporized precursor from flowing through the first and second valves from the gas supply.

In some configurations, the gas delivery system includes a controller configured to close the first valve and open the second valve to divert the vaporized precursor through the second valve from the gas supply.

In some configurations, the gas delivery system includes a controller configured to close the second valve and open the first valve to supply the vaporized precursor through the first valve from the gas supply, where the first valve is configured to supply the vaporized precursor to the processing chamber.

According to another aspect, the present disclosure provides a valve assembly for a substrate processing system. The valve assembly may include a first flow passage, a second flow passage, a third flow passage, a fourth flow passage, and a valve actuator. The first flow passage may be configured to fluidly communicate with a first gas supply. The second flow passage may be configured to fluidly communicate with a second gas supply. The third flow passage may extend from the second flow passage to a first outlet. The fourth flow passage may be in fluid communication with the first flow passage and configured to fluidly communicate with a processing chamber of the substrate processing system. The valve actuator may include a diaphragm moveable between an open position and a closed position. The second flow passage may be in fluid communication with the third flow passage in the closed position, and in fluid communication with the fourth flow passage in the open position.

In some configurations, the second gas supply includes a source of vaporized precursor.

In some configurations, the diaphragm is operable to prevent fluid communication between the second flow passage and the fourth flow passage in the closed position.

In some configurations, the valve assembly includes a controller configured to open and close the diaphragm.

In some configurations, the controller is configured to close the diaphragm in first and second modes of operation, and is configured to open the diaphragm in a third mode of operation.

In some configurations, the second flow passage includes an inlet and a second outlet, and the third flow passage extends from the first outlet to the second outlet.

In some configurations, the diaphragm is configured to sealingly engage the second outlet.

In some configurations, the diaphragm is configured to divert a flow of vaporized precursor from the second flow passage to the third flow passage in the closed position.

In some configurations, the diaphragm is configured to supply a flow of vaporized precursor from the second flow passage to the fourth flow passage in the open position.

In some configurations, the diaphragm is configured to supply a flow of purge gas from the first flow passage to the fourth flow passage in the open and closed positions.

According to another aspect, a valve assembly for a substrate processing system is provided. The valve assembly may include a valve actuator and a valve body coupled to the valve actuator. The valve body may extend from a first end to a second end. The first end may include first, second, third, and fourth ports. The second end may include fifth, sixth and seventh ports. The first port may be in fluid communication with the fifth port through a first flow passage. The second port may be in fluid communication with the sixth port through a second flow passage. The third port may be in fluid communication with the sixth port through a third flow passage. The fourth port may be in fluid communication with the seventh port through a fourth flow passage. The fourth flow passage may be configured to fluidly communicate with a processing chamber of the substrate processing system.

In some configurations, the valve actuator includes a diaphragm sealingly engaged with the second end of the valve body.

In some configurations, the diaphragm is configured to sealingly engage the sixth port such that the diaphragm and the second end of the valve body define a chamber.

In some configurations, the chamber includes an annular configuration.

In some configurations, the first and fourth flow passages are in fluid communication with the chamber, and the second flow passage is in fluid communication with the third flow passage.

In some configurations, the first and fourth flow passages are disposed radially outward from the second and third flow passages.

In some configurations, the valve actuator is configured to divert a flow of vaporized precursor from the second flow passage to the third flow passage in a closed position.

In some configurations, the valve actuator is configured to supply a flow of vaporized precursor from the second flow passage to the fourth flow passage in an open position.

In some configurations, the valve actuator is configured to supply a flow of purge gas from the first flow passage to the fourth flow passage in the open and closed positions.

According to another aspect, the present disclosure provides a gas delivery system for a substrate processing system. The gas delivery system may include a first gas channel, a cylinder defining a second gas channel, a third gas channel, and a fourth gas channel. The first gas channel may be in fluid communication with a first gas supply. The second gas channel may include an inlet end and an outlet end. The cylinder may be at least partially disposed within the first gas channel such that the cylinder and the first gas channel collectively define a flow channel between an outer surface of the cylinder and an inner surface of the first gas channel. The third gas channel may include a first end in fluid communication with the flow channel and a second end in fluid communication with a second gas supply. The fourth gas channel may extend from the first gas channel. The fourth gas channel may be in fluid communication with the outlet end of the second gas channel. The inlet end of the second gas channel may be configured to receive a first flow from the first gas supply and a second flow from the second gas supply.

In some configurations, the first gas supply includes a source of remote plasma clean gas.

In some configurations, the second gas supply includes a source of purge gas.

In some configurations, the gas delivery system may include a valve in fluid communication with the first gas channel.

In some configurations, the valve may be operable in an open position to permit a flow of gas from the first gas supply to enter the inlet end of the cylinder, and a closed position to prevent a flow of gas from entering the inlet end of the cylinder.

In some configurations, the first gas channel includes a port sealingly engaged with the cylinder.

In some configurations, the valve includes a valve seat, and the inlet end of the second gas channel is disposed downstream of the valve seat and upstream of the port.

In some configurations, the first gas channel includes a port sealingly engaged with the cylinder.

In some configurations, the cylinder is concentrically disposed within the first gas channel.

In some configurations, the gas delivery system may include a heater configured to heat the flow channel.

In some configurations, the outer surface of the cylinder includes first and second radially outwardly extending projections, and the first and second projections define a gap in fluid communication with the first and third gas channels.

In some configurations, the gas delivery system may include a valve and a controller. The valve may be in fluid communication with the first gas channel. The controller may be configured to close the valve to prevent a remote plasma clean gas from flowing through the second gas channel from the first gas supply, and open the valve to supply the remote plasma clean gas through the second gas channel from the first gas supply.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 10A is a cross-sectional view of an example of a gas channel including a cylinder in a first mode of operation according to the present disclosure;

FIG. 10B is a cross-sectional view of an example of a gas channel including a cylinder in a second mode of operation according to the present disclosure;

FIG. 12 is a perspective view of a valve assembly according to the present disclosure;

FIG. 13 is a cross-sectional view of the valve assembly of FIG. 12;

In the drawings, reference numbers may be reused to identify similar and/or identical elements.

DETAILED DESCRIPTION

A gas delivery assembly according to the present disclosure reduces or eliminates on-wafer particles during processing by reducing or eliminating precursor condensation in a dead-leg volume. For example only, the present disclosure may be used in processes involving atomic layer deposition (ALD) of thin films. In this application, precursor condensation is reduced or eliminated in the dead-leg volume above a gas distribution device such as a showerhead. While the present disclosure is being described in the context of ALD, the gas delivery assembly according to the present disclosure can be used in other substrate processing applications such as CVD, PECVD, PEALD, or other types of processes.

In some examples, the present disclosure includes a first connector that supplies purge gas using an annular purge channel to a dead-leg volume. In some examples, the purge gases may include as argon, nitrogen, oxygen, or mixtures thereof. Other types of purge gas may be used. As will be described further below, purge gas flow is used to eliminate precursor gas and remote plasma gas (such as atomic fluorine) diffusion into the first connector and the annular purge channel, respectively.

Figure 1:
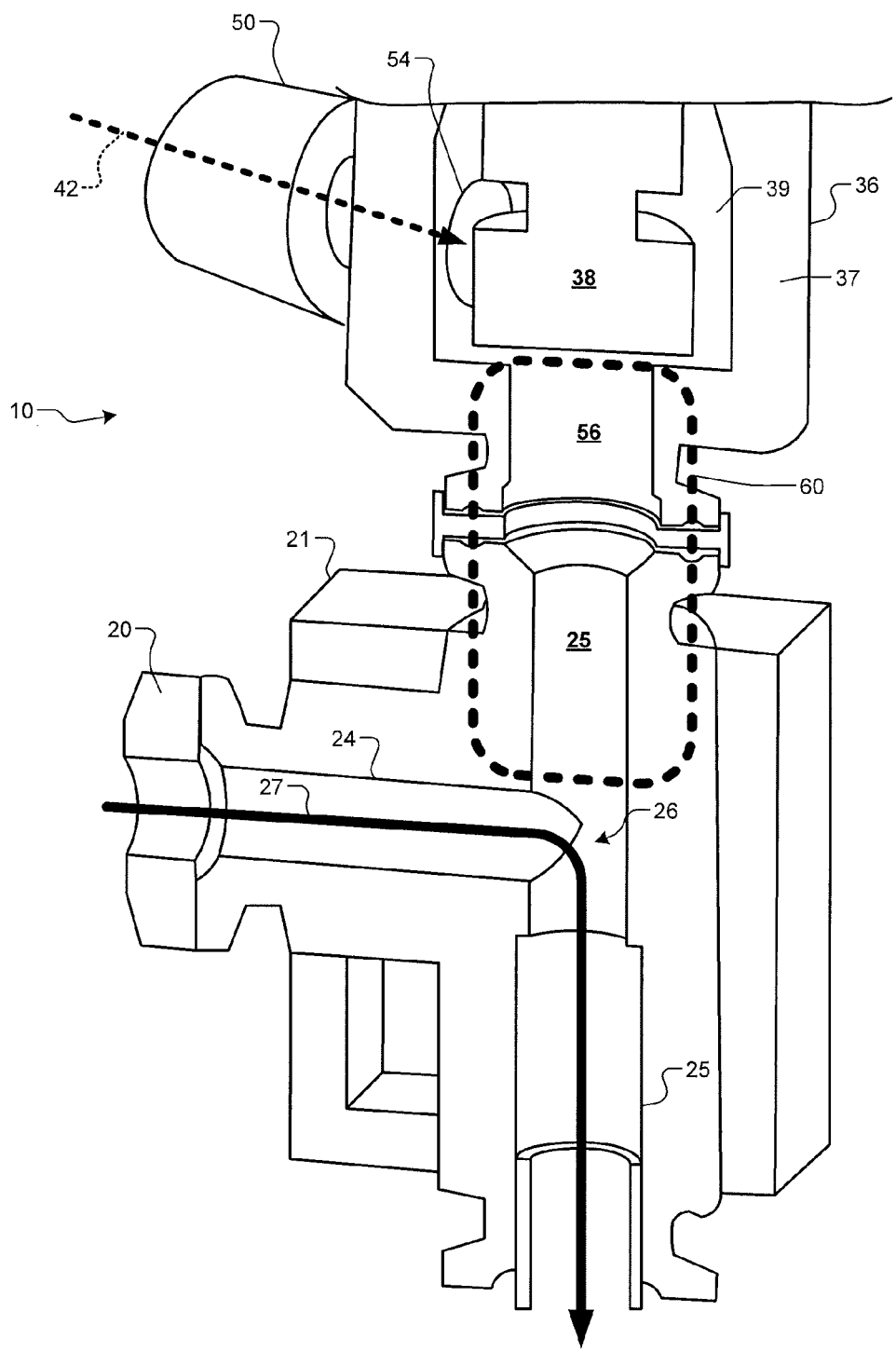
FIG. 1 is a cross-sectional view of a gas delivery assembly according to the prior art.
Figure 2:
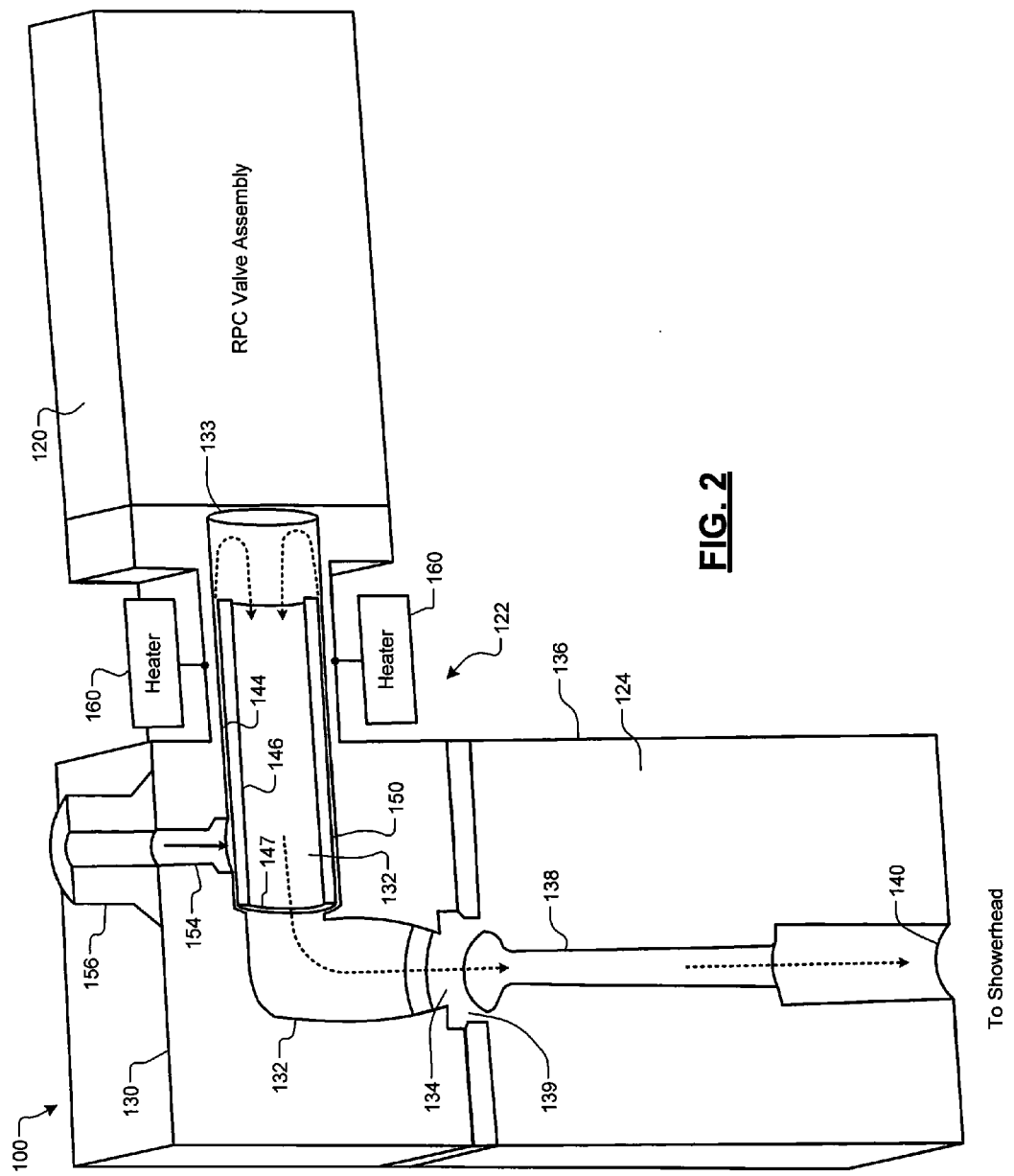
FIG. 2 is a cross-sectional view of an example of a gas delivery assembly according to the present disclosure.

Referring now to FIG. 2, a gas delivery assembly 100 is shown to include an RPC valve assembly 120, a first connector 122, and second connector 124. The first connector 122 includes a first body 130 defining a first gas channel 132 including an inlet 133 and an outlet 134. The second connector 124 includes a second body 136 defining a second gas channel 138 including an inlet 139 and an outlet 140. The outlet 134 of the first gas channel 132 is connected to the inlet 139 of the second gas channel 138. In some examples, first gas channel 132 is generally "L"-shaped or elbow-shaped.

The first connector 122 includes an annular purge channel 144 that is arranged around a portion of the first gas channel 132 adjacent to the inlet 133 of the first connector 122. The annular purge channel 144 supplies purge gas to an area near the inlet 133. In some examples, a cylinder 146 may be inserted inside of the first gas channel 132 adjacent to the inlet 133 of the first connector 122 to define the annular purge channel 144. One end 147 of the cylinder 146 abuts an inner surface of the first gas channel 132 in a position that is spaced from the inlet 133. A cavity 150 between the body 130 and a radially outer surface of the cylinder 146 defines the annular purge channel 144.

The body 130 further defines a third gas channel 154 that is connected to the cavity 150. A fitting or valve 156 may be used to connect the third gas channel 154 to a purge gas source. Purge gas is supplied to the third gas channel 154 and the annular purge channel 144. The purge gas flows through the annular purge channel 144 into the area near the inlet 133. The purge gas flows through the first gas channel 132 to the second gas channel 138. The purge gas is supplied during remote plasma cleaning (while RPC gas is supplied by the RPC valve). In some examples, the purge gas is supplied during dosing using vaporized precursor gas.

In some examples, a heater 160 is used to maintain the temperature in the area in the vicinity of the annular purge channel 144 at a predetermined minimum temperature. More particularly, the heater 160 may be connected to the body 130 and may be used to heat the body (at least the portion including the dead-leg volume) to a temperature above a condensation temperature of the precursor gas. In some examples, the temperature is maintained at a predetermined temperature above approximately ~65° C., although the temperature will vary depending on the type of precursor gas that is used and its condensation temperature.

Figure 3:
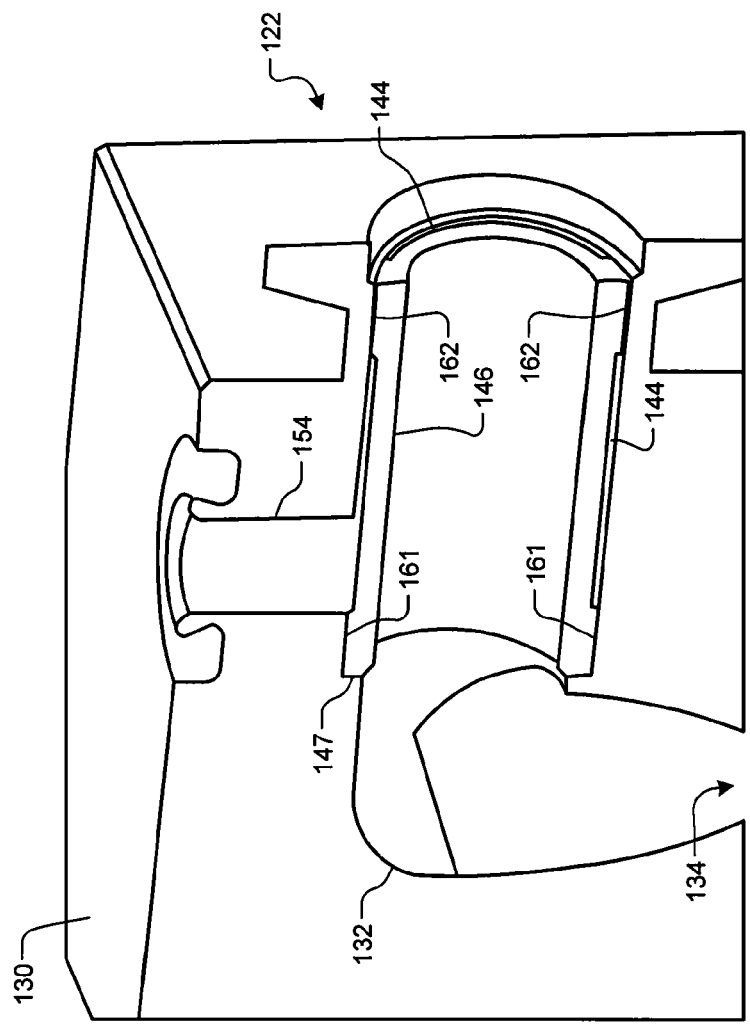
FIG. 3 is an enlarged cross-sectional view of an example of a first connector according to the present disclosure.

Referring now to FIG. 3, an example of the first connector 122 is shown. The cylinder 146 may include a radial projection 161 located at one end of thereof. The radial projection 161 may extend fully or partially around an outer diameter of the cylinder 146 to provide a gas seal. Two or more radial projections 162 may be located at an opposite end of the cylinder 146 adjacent to the inlet 133. Locations between the two or more radial projections 162 may be open to allow gas to flow from the annular gas channel 144 to an area adjacent to the inlet 133. Purge gas is directed through the annular gas channel 144, into the inlet 133 and out through the first and second gas channels 132 and 138, respectively during dose and/or remote plasma clean to eliminate the dead-leg volume.

Figure 4:
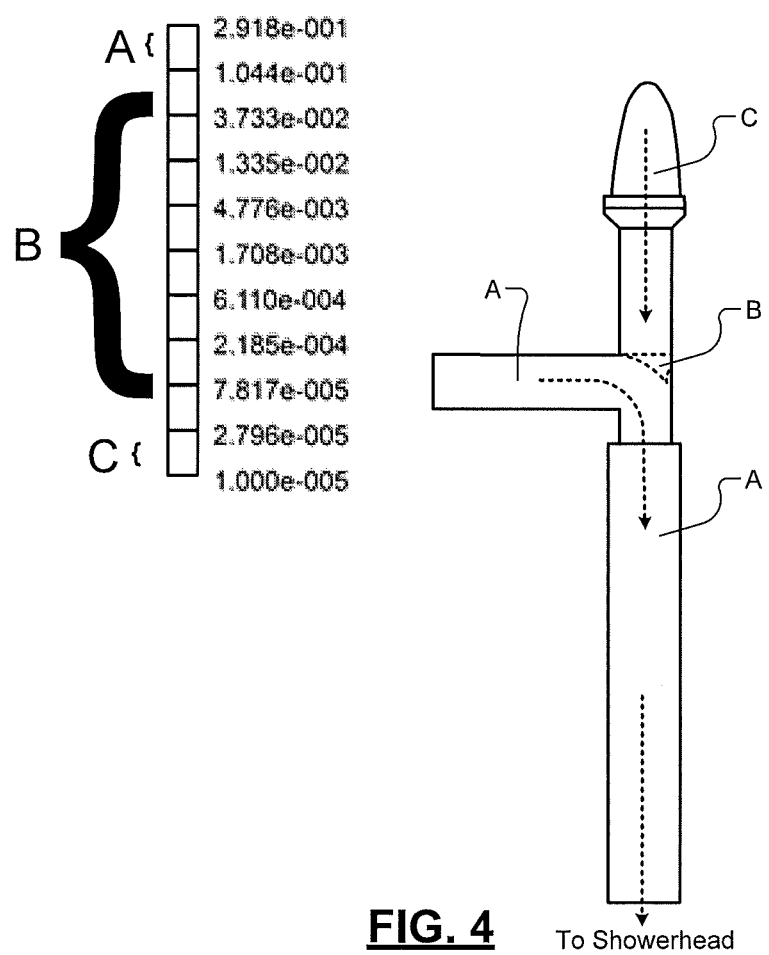
FIG. 4 illustrates an example of flow through a gas delivery assembly during dosing according to the present disclosure.
Figure 5:
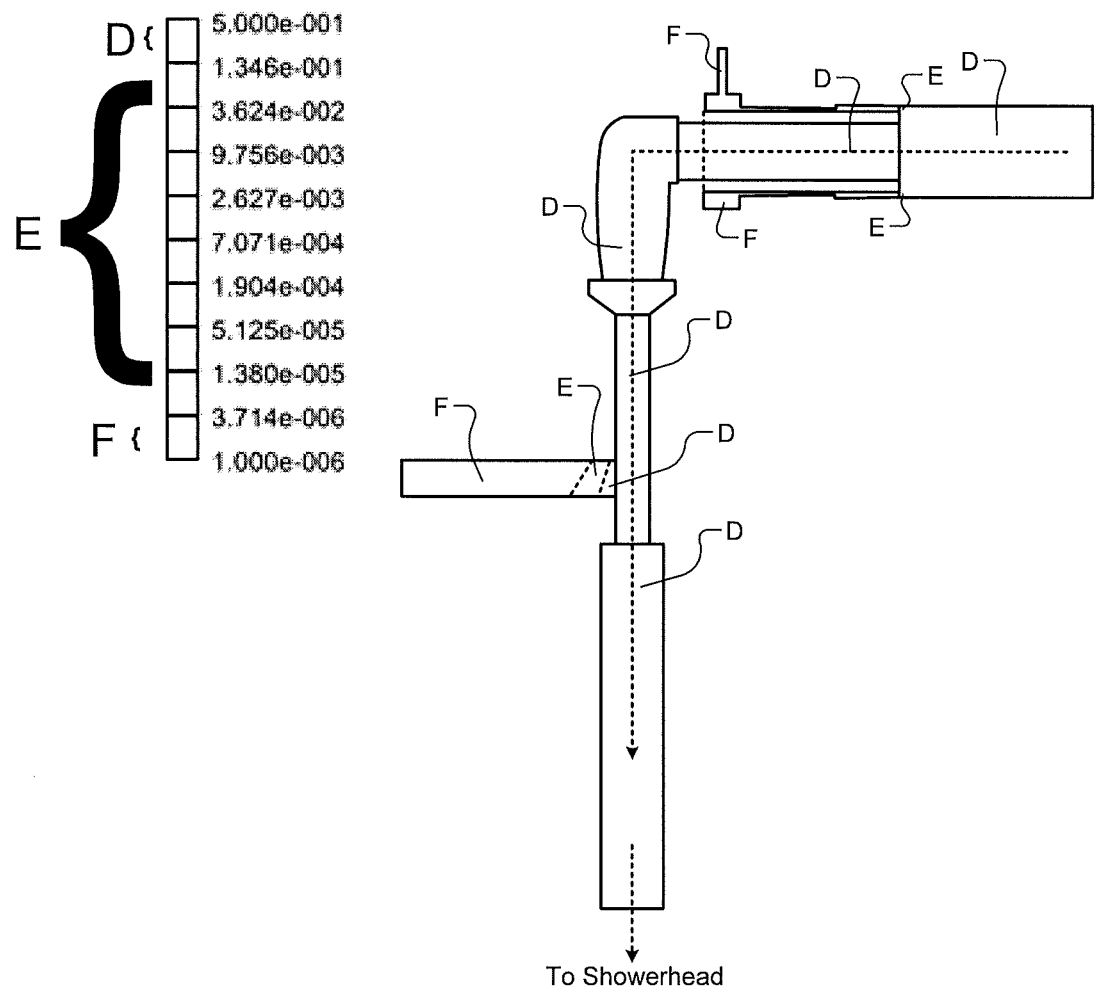
FIG. 5 illustrates an example of flow through a gas delivery assembly during remote plasma cleaning according to the present disclosure.

Referring now to FIGS. 4 and 5, operation of the gas delivery system is shown. In FIG. 4, operation is shown during delivery of precursor. Vaporized precursor concentration is high in regions labelled A and low or non-existent in regions labelled C due to the flow of purge gas in the annular channel 144. A small transition region labelled "B" (transitioning between very low and high concentrations) is minimized and is located between the regions labelled A and C.

In FIG. 5, operation is shown during remote plasma cleaning. Remote plasma clean (RPC) gas concentration (such as atomic fluorine) is very high in regions labelled D and very low in regions labelled F. Transition regions labelled E are minimized and are located between the regions labelled D and F. Purge gas flows in the annular channel 144.

The gas delivery assembly described above prevents back diffusion of both precursor gas and RPC gas such as atomic fluorine. In some examples, the operating flow rate may be optimized using computational modeling to maintain flow of the purge gas at a minimum in order to minimize the impact of purge gas dilution to the RPC gas. When using the purge gas as described herein, on-wafer particle issues are mitigated and improved particle performance may be maintained for more than 100 RPC clean hours.

Figure 6:
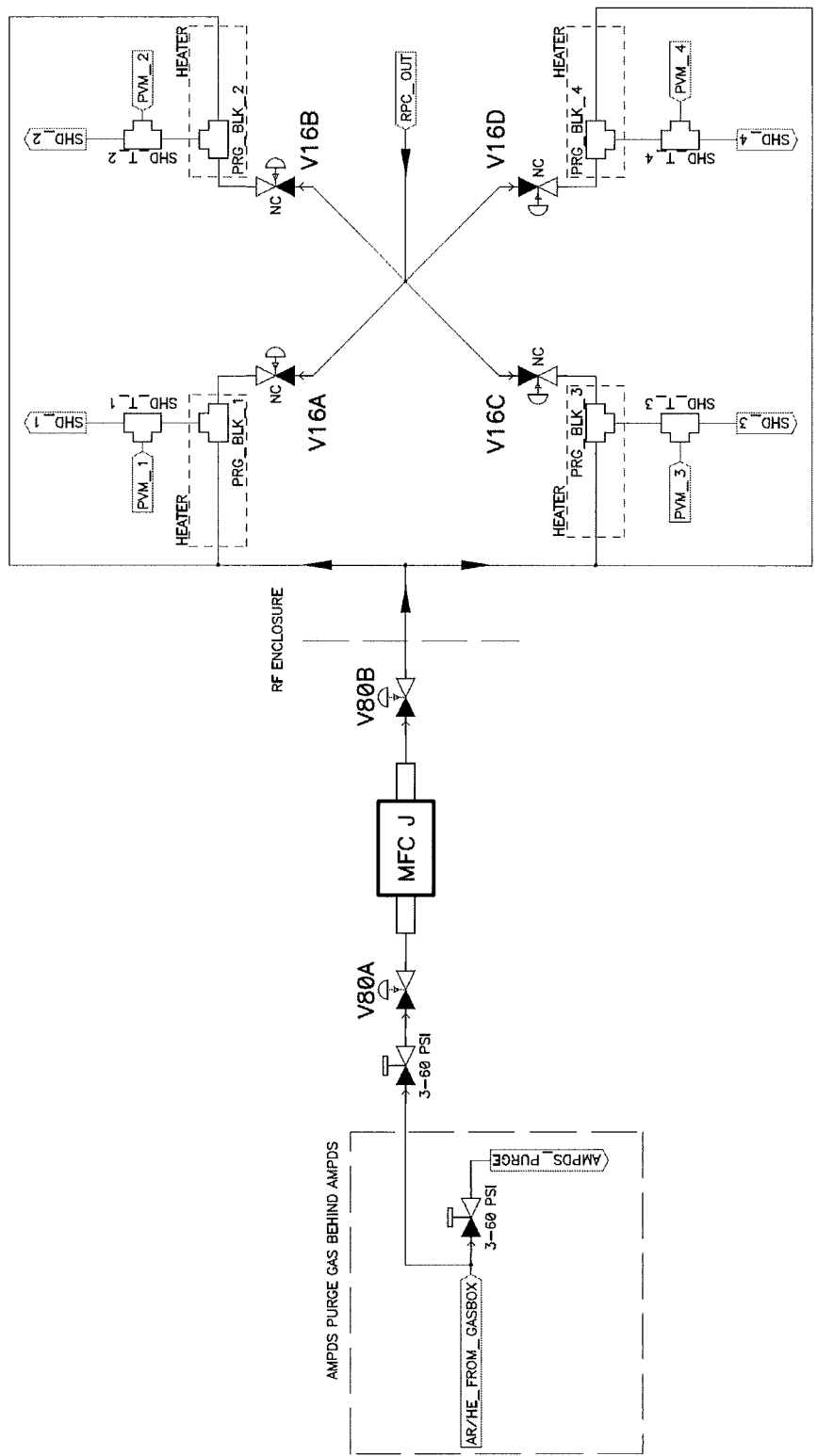
FIG. 6 is a schematic illustrating an example of gas delivery to a plurality of gas distribution devices according to the present disclosure.

Referring now to FIG. 6, an example of a schematic for connecting the elbow connector and heater is shown for a system including multiple gas distribution devices such as showerheads.

Figure 7:
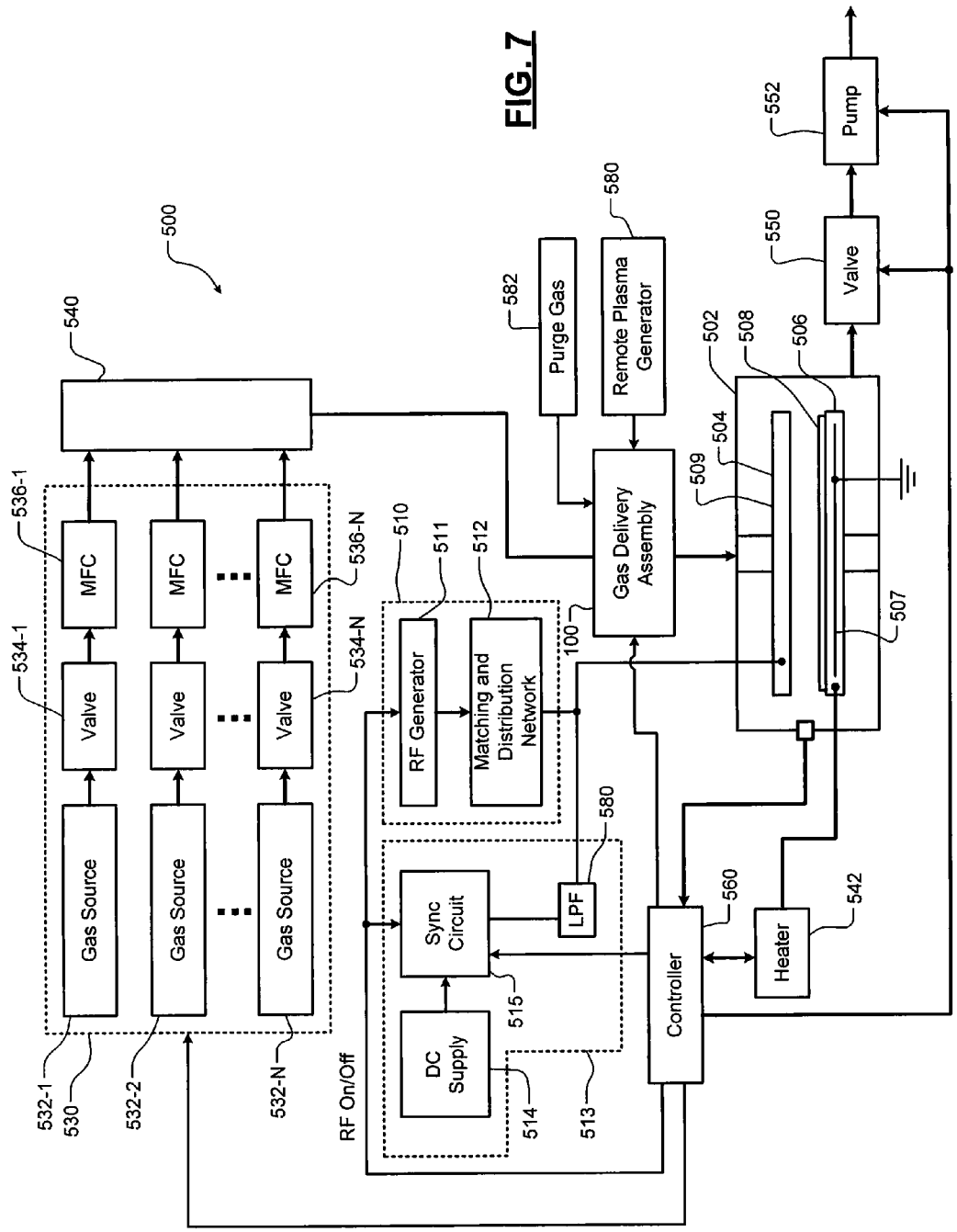
FIG. 7 is a functional block diagram of an example of a substrate processing chamber for performing ALD, PEALD, CVD or PECVD according to the present disclosure.

Referring now to FIG. 7, an example of a substrate processing chamber 500 for performing substrate processing such as ALD, CVD, PEALD or PECVD is shown. The substrate processing chamber 500 includes a processing chamber 502 that encloses other components of the substrate processing chamber 500 and contains the RF plasma (if used). The substrate processing chamber 500 includes an upper electrode 504 and a pedestal 506 including a lower electrode 507. During operation, a substrate 508 is arranged on the pedestal 506 between the upper electrode 504 and the lower electrode 507.

For example only, the upper electrode 504 may include a showerhead 509 that introduces and distributes process gases. The showerhead 509 may include a stem portion including one end connected to a top surface of the processing chamber. A base portion is generally cylindrical and extends radially outwardly from an opposite end of the stem portion at a location that is spaced from the top surface of the processing chamber. A substrate-facing surface of the base portion of the showerhead includes a plurality of holes through which process gas or purge gas flows. Alternately, the upper electrode 504 may include a conducting plate and the process gases may be introduced in another manner. The lower electrode 507 may be arranged in a non-conductive pedestal. Alternately, the pedestal 506 may include an electrostatic chuck that includes a conductive plate that acts as the lower electrode 507.

An RF generating system 510 generates and outputs an RF voltage to one of the upper electrode 504 and the lower electrode 507. The other one of the upper electrode 504 and the lower electrode 507 may be DC grounded, AC grounded or floating. For example only, the RF generating system 510 may include an RF voltage generator 511 that generates the RF voltage that is fed by a matching and distribution network 512 to the upper electrode 504 or the lower electrode 507.

A gas delivery system 530 includes one or more gas sources 532-1, 532-2, . . . , and 532-N (collectively gas sources 532), where N is an integer greater than zero. The gas sources supply one or more precursors and mixtures thereof. The gas sources may also supply purge gas. In some examples, vaporized precursor gas may also be used. The gas sources 532 are connected by valves 534-1, 534-2, . . . , and 534-N (collectively valves 534) and mass flow controllers 536-1, 536-2, . . . , and 536-N (collectively mass flow controllers 536) to a manifold 540. An output of the manifold 540 is fed to the processing chamber 502. For example only, the output of the manifold 540 may be fed to the showerhead 509 via the precursor gas and remote plasma delivery system 100.

A heater 542 may be connected to a heater coil (not shown) arranged in the pedestal 506. The heater 542 may be used to control a temperature of the pedestal 506 and the substrate 508. A valve 550 and pump 552 may be used to evacuate reactants from the processing chamber 502. A controller 560 may be used to control components of the substrate processing chamber 500.

A remote plasma generator 580 may be used to supply remote plasma clean (RPC) gas to the precursor gas and remote plasma delivery system 100 during operation. The controller 560 may also be used to control the heater 160 in the gas delivery assembly 100 and to control the supply of the RPC gas, the purge gas and the vaporized precursor.

Figure 9:
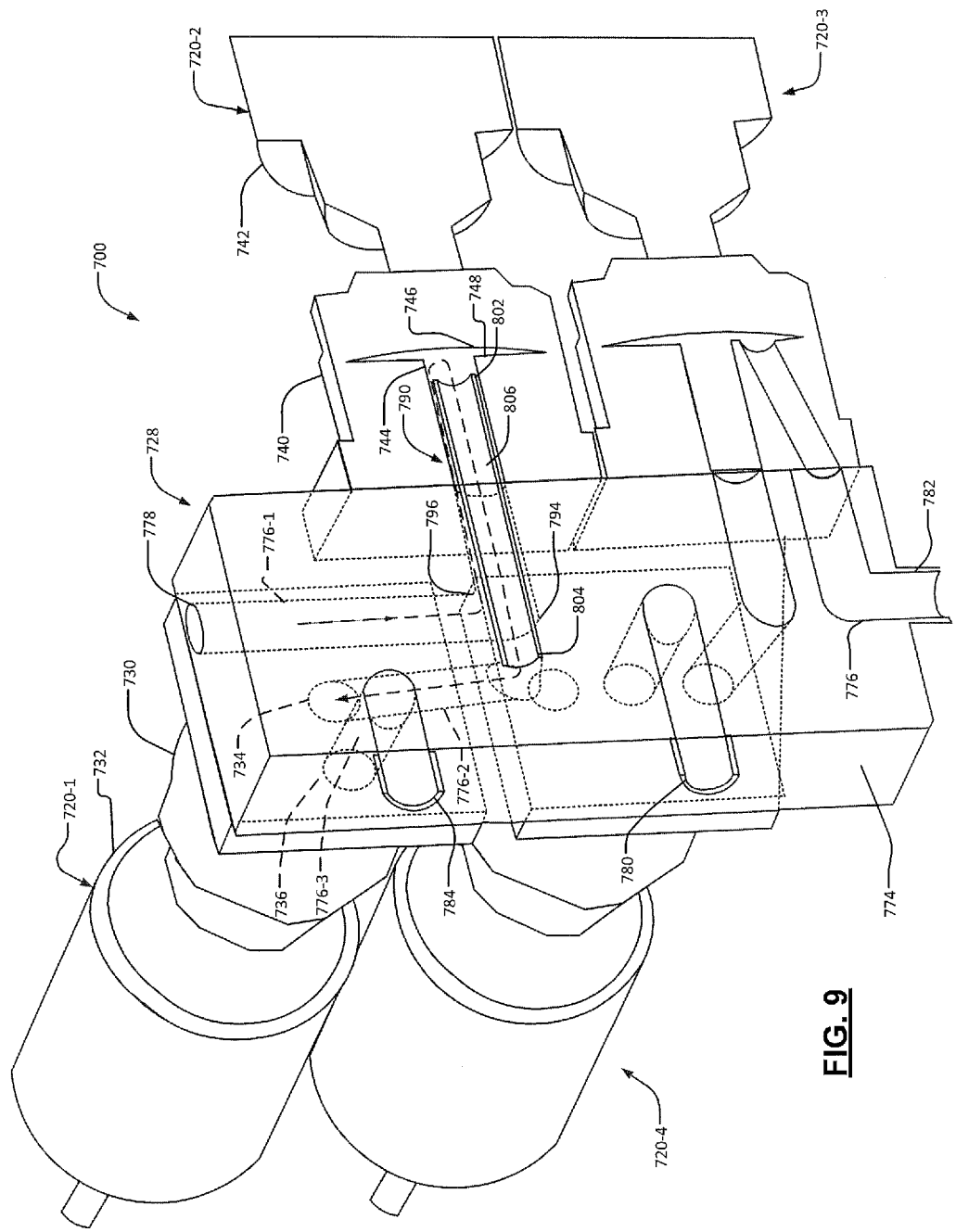
FIG. 9 is a sectional view of an example of a gas delivery assembly according to the present disclosure.

Referring now to FIG. 9, another gas delivery assembly 700 according to the principles of the present disclosure is illustrated. The gas delivery assembly 700 includes one or more valve assemblies 720-1, 720-2 . . . and 720-N (collectively valve assemblies 720), a controller (not shown), a valve manifold 728, and a conduit or cylinder 790. In some configurations, the gas delivery assembly 700 includes a first valve assembly 720-1, a second valve assembly 720-2, a third valve assembly 720-3, and a fourth valve assembly 720-4. It will be appreciated that the gas delivery assembly 700 may include more or less than four valve assemblies 720 according to the present disclosure. The valve assemblies 720 may include any commercially available 2-port or 3-port valve assembly having a pneumatically or electronically actuated diaphragm.

As will be explained in more detail below, the valve assemblies 720 are configured to selectively fluidly communicate with the valve manifold 728. In this regard, as illustrated in FIG. 9, the controller (e.g., controller 560 in FIG. 7) may selectively open and close the valve assemblies 720-N as needed to control the flow of one or more fluids through the gas delivery assembly 700. In particular, the controller may selectively open and/or close the first, second, third, and/or fourth valve assemblies 720-1, 720-2, 720-3, 720-4 to operate the gas delivery assembly 700 in divert, supply, and standby modes of operation.

The first valve assembly 720-1 includes a valve body 730 and a valve actuator 732. The valve body 730 includes an inlet 734 and an outlet 736. The valve actuator 732 is configured to control flow of fluid through the valve body 730. In particular, when the valve actuator 732 is in a first or open state, the inlet 734 of the valve body 730 is in fluid communication with the outlet 736 of the valve body 730. When the valve actuator 732 is in a second or closed state, the inlet 734 of the valve body 730 is prevented from fluidly communicating with the outlet 736 of the valve body 730. For example, the first valve assembly 720-1 may include a diaphragm (not shown), such that in the closed state, the diaphragm prevents the inlet 734 from fluidly communicating with the outlet 736. In some configurations, the first valve assembly 720-1 is configured to divert the flow of a fluid (e.g., vaporized precursor gas) away from the processing chamber (e.g., processing chamber 502). Accordingly, the first valve assembly 720-1 may be referred to herein as the divert valve assembly 720-1.

The second valve assembly 720-2 includes a valve body 740 and a valve actuator 742. The valve body 740 includes a first port or inlet 744, a second port or inlet (not shown), and a third port or outlet (not shown). The valve actuator 742 is configured to control a flow of fluid through the valve body 740. In particular, when the valve actuator 742 is in a first or open state, the first inlet 744 of the valve body 740 is in fluid communication with the outlet of the valve body 740. When the valve actuator 742 is in a second or closed state, the first inlet 744 of the valve body 740 is prevented from fluidly communicating with the outlet of the valve body 740. For example, the second valve assembly 720-2 may include a diaphragm 746, such that in the closed state, the diaphragm 746 prevents the first inlet 744 and/or the second inlet from fluidly communicating with the outlet. In this regard, the first inlet 744 may define a valve seat 748, such that in the closed state, the diaphragm 746 sealingly engages the valve seat 748. In some configurations, the second valve assembly 720-2 is configured to control the flow of a fluid (e.g., vaporized precursor gas) to the processing chamber (e.g., processing chamber 502). Accordingly, the second valve assembly 720-2 may be referred to herein as the flow valve assembly 720-2.

Figure 8:
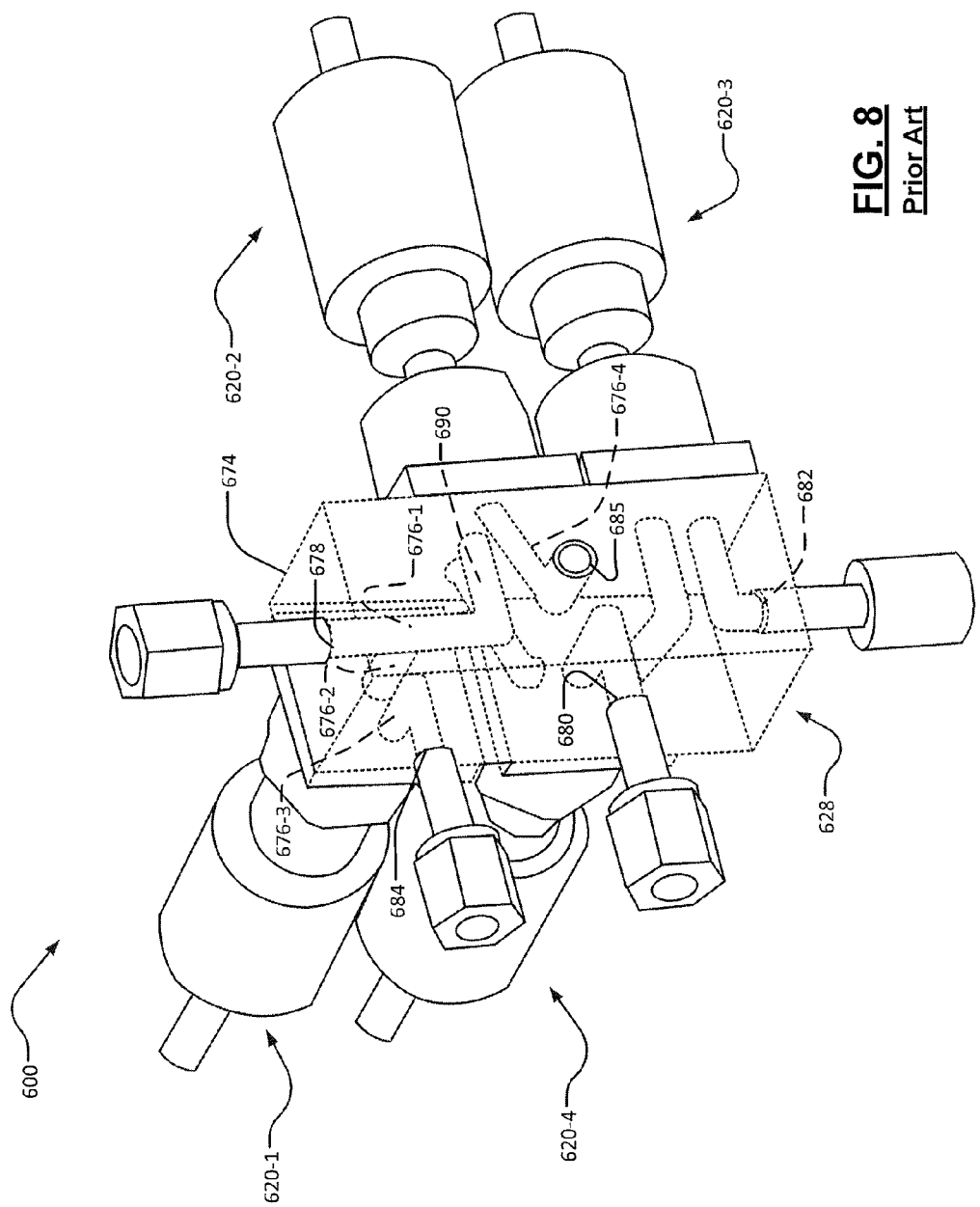
FIG. 8 is a perspective view of a gas delivery assembly according to the prior art.

The valve manifold 728 includes a body 774 defining one or more gas channels 776-1, 776-2 . . . and 776-N (collectively gas channels 776), first, second and third inlets 778, 780, 782, a first outlet 784, and a second outlet (e.g., second outlet 685 of FIG. 8). The first outlet 784 and the second outlet of the valve manifold 728 are fluidly coupled to the first, second, and third inlets 778, 780, 782 via the gas channels 776 and one or more of the valve assemblies 720. In this regard, the valve assemblies 720 are configured to selectively control the flow of fluid from first, second, and third inlets 778, 780, 782 to the first and second outlets through the gas channels 776.

A first gas channel 776-1 extends from, and fluidly communicates with, the first inlet 778 of the valve manifold 728 and the first inlet 744 of the second valve assembly 720-2. The first gas channel 776-1 includes a port or aperture 794. In some examples, the first gas channel 776-1 includes an elbow 796 such that the first gas channel defines a generally "L"-shaped construct.

With reference to FIGS. 9-10B, a cylinder 790 includes a generally hollow cavity extending from a first end 802 to a second end 804. In some configurations, the first end 802 defines a fluid inlet and the second end 804 defines a fluid outlet such that the generally hollow cavity of the cylinder 790 defines a flow passage or gas channel 806 extending from the first end 802 to the second end 804. In an assembled configuration, the first end 802 of the cylinder 790 is disposed within, and configured to fluidly communicate with, the first gas channel 776-1. The second end 804 of the cylinder 790 is configured to fluidly communicate with a second gas channel 776-2. In particular, in some configurations, the first end 802 of the cylinder 790 is disposed within the valve body 740, and the second end of the cylinder 790 is disposed within, or otherwise in fluid communication with, the second gas channel 776-2. In this regard, the first end 802 of the cylinder 790 is offset from the inlet 744 and/or the valve seat 748 of the valve body 740, such that the first end 802 and the valve seat 748 define an axial extending space or void 808. In particular, the first end 802 of the cylinder 790 is upstream of the valve seat 748.

As illustrated in FIGS. 10A and 10B, at least a portion of the cylinder 790 is disposed within the first gas channel 776-1 such that the cylinder 790 extends through the aperture 794. In this regard, the cylinder 790 may be sealingly disposed within the aperture 794. As illustrated in FIG. 10A, an outer surface 809 of the cylinder 790 defines a cross-sectional dimension D1 that is less than a cross-sectional dimension D2 of at least a portion of the first gas channel 776-1 and/or the inlet 744. Accordingly, in the assembled configuration, the cylinder 790 and the first gas channel 776-1 and/or the inlet 744 define an annular flow channel 810 therebetween.

In some configurations, at least one of the cylinder 790 and the first gas channel 776-1 includes a circular cross section such that the cross-sectional dimensions D1, D2 define a diameter of the cylinder 790 and/or the first gas channel 776-1, respectively. The cylinder 790 may be concentrically disposed within the first gas channel 776-1 and/or the inlet 744 such that the annular flow channel 810 is symmetrically disposed about the cylinder 790. While the cylinder 790 is generally shown and described herein as being a circular cylinder, it will be appreciated that a cross section of the cylinder 790 may define other shapes within the scope of the present disclosure. For example, in some configurations, the cylinder 790 may define an oval, a triangle, a rectangle, or other polygon within the scope of the present disclosure.

The second gas channel 776-2 extends from the second end 804 of the cylinder 790 to the inlet 734 of the first valve assembly 720-1. In some configurations, the second gas channel 776-2 extends from the aperture 794 to the inlet 734 of the first valve assembly 720-1. A third gas channel 776-3 extends from the outlet 736 of the first valve assembly 720-1 to the first outlet 784 of the valve manifold 728. A fourth gas channel (not shown) extends from the outlet of the second valve assembly 720-2 to the second outlet of the valve manifold 728.

A method of operating the gas delivery assembly 700 will now be described with reference to FIGS. 9-10B and 11. The method may include a continuous cycle of at least three modes of operation, including a divert mode, a supply mode, and a standby mode. In this regard, the divert mode may precede the supply mode, the supply mode may precede the standby mode, and the standby mode may precede the divert mode. In the divert mode, vaporized precursor may be used to replace stale precursor in the gas channels 776. In the supply mode, vaporized precursor is supplied to the processing chamber. In the standby mode, vaporized precursor is not supplied and is not diverted.

Figure 11:
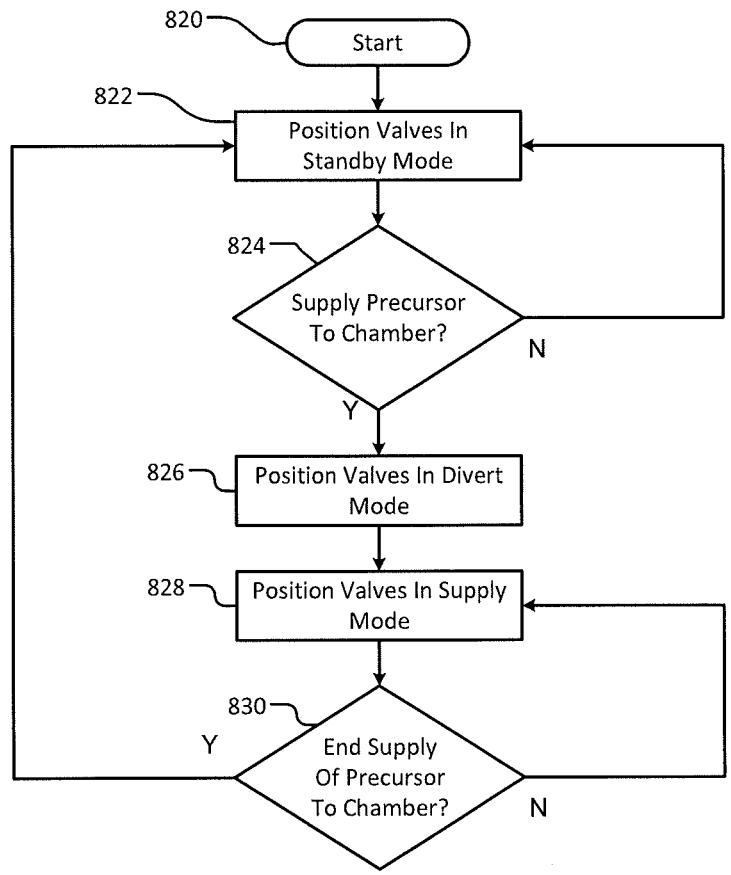
FIG. 11 is a flowchart depicting an example of a method for eliminating a deadleg volume in a valve manifold assembly according to the present disclosure

As shown in FIG. 11, the method for operating the valves begins at 820. At 822, the first and second valve assemblies 720-1, 720-2 are closed such that flow through the first gas channel 776-1 is prevented. In this regard, 822 may correspond to the standby mode of operation. If the valves 720-1, 720-2 remain in the standby mode for a sufficient amount of time, vaporized precursor gas will stagnate within the first gas channel 776-1 of the valve manifold 728 and/or the first inlet 744 of the second valve assembly 720-2.

At 824, the method determines whether or not vaporized precursor needs to be supplied to the substrate processing chamber. If 824 is false, the method returns to 822. If 824 is true, the method continues to 826 where the first and second valve assemblies 720-1, 720-2 are positioned in the divert mode of operation for a predetermined period.

In particular, at 826, the first valve assembly 720-1 is opened and the second valve assembly 720-2 is closed. In this regard, the diaphragm 746 abuts or otherwise sealingly engages the valve seat 748. Accordingly, during the divert mode of operation, the annular flow channel 810 supplies fluid from the first gas channel 776-1 to the first end 802 of the cylinder 790. For example, the fluid may flow through the annular flow channel 810 in a first direction. At the valve seat, the fluid is redirected by the diaphragm 746 to flow through the gas channel 806. For example, the fluid may flow through the gas channel 806 in a second direction that is opposite the first direction. The gas channel 806 supplies the fluid from the annular flow channel 810 to the second gas channel 776-2. The second gas channel 776-2 supplies the fluid from the gas channel 806 to the first valve assembly 720-1, where it can be directed to various locations inside, or out of, the substrate processing system through the third gas channel 776-3. Accordingly, during the divert mode of operation, the cylinder 790 and the fluid flowing in the first and second directions through the annular flow channel 810 and the gas channel 806, respectively, prevents the fluid from becoming trapped, or otherwise stagnating in the first gas channel 776-1. In particular, the cylinder 790 and the fluid flowing in the first and second directions through the annular flow channel 810 and the gas channel 806 prevents the fluid from stagnating downstream of the aperture 794 and the second flow channel 776-2 and upstream of the second valve assembly 720-2.

After the predetermined period, the first and second valve assemblies 720-1, 720-2 are positioned in the supply mode of operation at 828. In particular, the first valve assembly 720-1 closed and the second valve assembly 720-2 is opened. In this regard, the diaphragm 746 is spaced from the valve seat 748. Accordingly, during the supply mode of operation, the annular flow channel 810 supplies fluid from the first gas channel 776-1 to the inlet 744 of the second valve assembly 720-2. From the second valve assembly 720-2, the fluid can be directed through another gas channel (e.g., fourth gas channel 676-4 in FIG. 8) of the valve manifold 728 to various locations within the substrate processing system, such as the processing chamber 502 (FIG. 7).

At 830, the method determines whether or not to end the supply of vaporized precursor to the substrate processing chamber. If 830 is false, the method returns to 828 where the first and second valve assemblies 720-1, 720-2 remain in the supply mode of operation. If 830 is true, the method returns to 822 where the first and second valve assemblies 720-1, 720-2 are positioned in the standby mode of operation.

Referring now to FIGS. 12-14B, another gas delivery assembly 900 according to the principles of the present disclosure is illustrated. The gas delivery assembly 900 includes a valve assembly 920 and a valve manifold 928. The valve assembly 920 includes a valve body 930 and a valve actuator 932 coupled to the valve body 930. The valve body 930 defines first, second, third, and fourth flow passages 934, 936, 938, 940 extending from a first end 942 of the valve body 930 to a second end 944 of the valve body 930.

The first flow passage 934 extends from a first port 946 in the first end 942 of the valve body 930 to a second port 948 in the second end 944 of the valve body 930. The second flow passage 936 extends from a third port 950 in the first end 942 of the valve body 930 to a fourth port 952 in the second end 944 of the valve body 930. The third flow passage 938 extends from the fourth port 952 in the second end 944 of the valve body 930 to a fifth port 954 in the first end 942 of the valve body 930. The fourth flow passage 940 extends from a sixth port 956 in the first end 942 of the valve body 930 to a seventh port 958 in the second end 944 of the valve body 930.

Figure 14A:
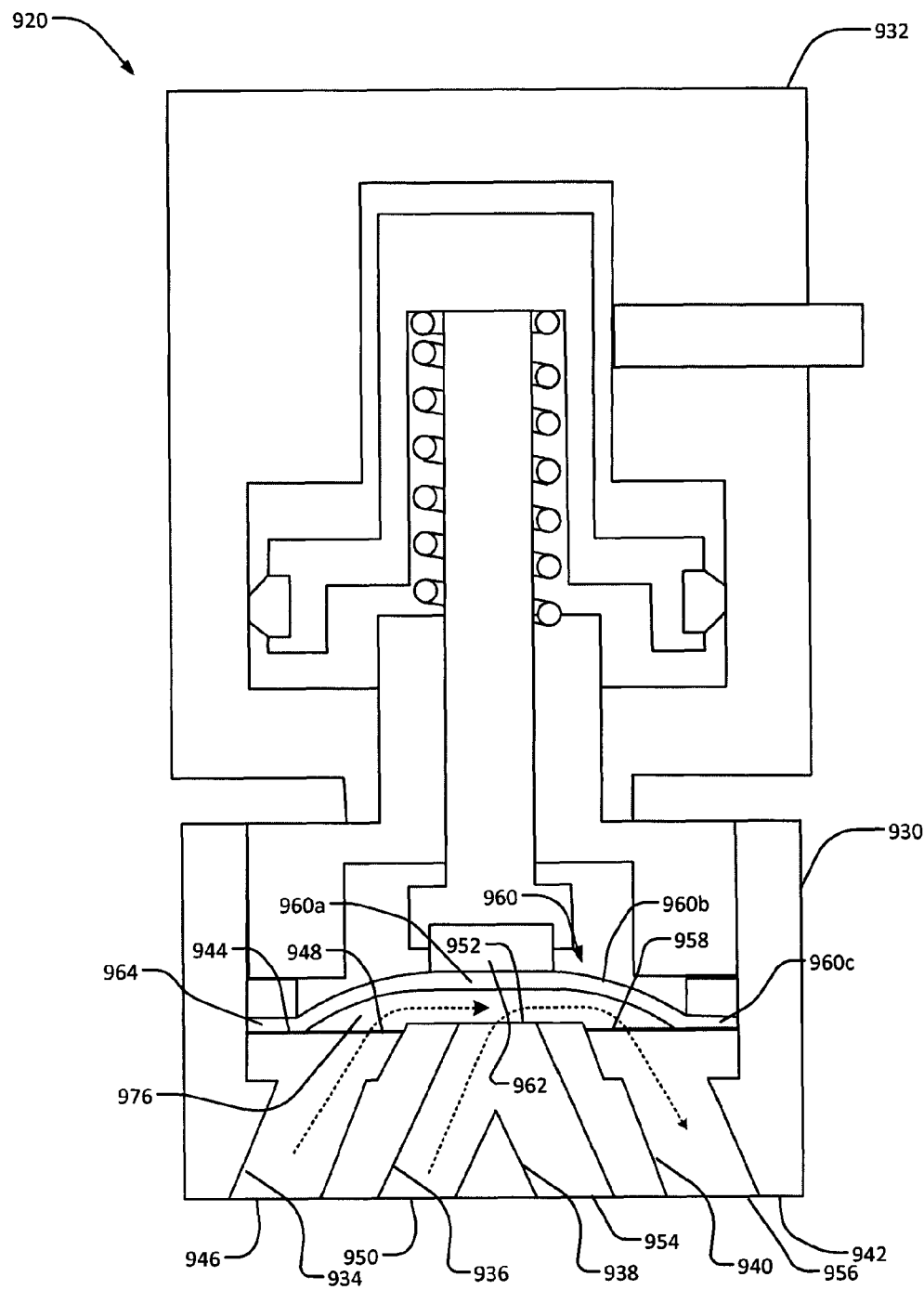
FIG. 14A is a cross-sectional view of the valve assembly of FIG. 12, showing the valve assembly in a first mode of operation.
Figure 14B:
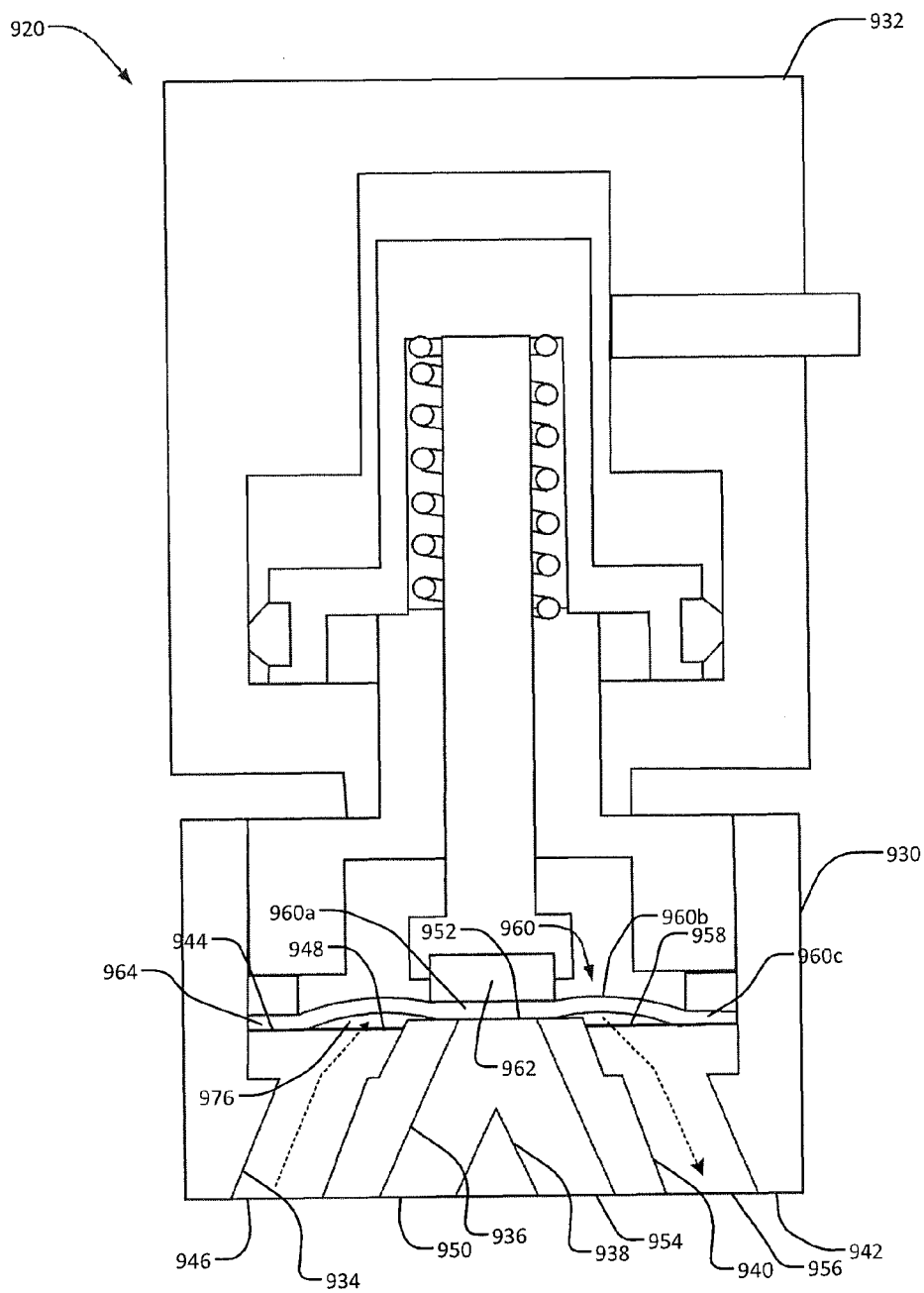
FIG. 14B is a cross-sectional view of the valve assembly of FIG. 12, showing the valve assembly in a second mode of operation.

As illustrated in FIGS. 14A and 14B, the fourth port 952 is located radially inward from the first, second, third, fifth, sixth, and seventh ports 946, 948, 950, 954, 956, 958. In this regard, the fourth port 952 may be centrally located relative to the second end 944 of the valve body 930. The second and sixth ports 948, 956 are located radially inward from the first and seventh ports 946, 958, and the third and fifth ports 950, 954 are located radially inward from the second and sixth ports 948, 956. Accordingly, in some configurations, the second and third flow passages 936, 938 define a generally V-shaped arrangement located radially inward from the first and fourth flow passages 934, 940. In particular, each of the first, second, third, and fourth flow passages 934, 936, 938, 940 may extend in a direction parallel to the others of the first, second, third, and fourth flow passages.

The first flow passage 934 is in fluid communication with a first fluid source, such as a purge gas source (not shown), for example. The second flow passage 936 is in fluid communication with a second fluid source, such as a vaporized precursor gas source, for example. The third flow passage 938 is in fluid communication with another portion of the gas delivery assembly 900, such as another valve assembly (e.g., divert valve assembly 720-1 in FIG. 9). The fourth flow passage is in fluid communication with another portion of the substrate processing system (e.g., processing chamber 502 of FIG. 7).

As will be explained in more detail below, in a supply mode of operation, the valve actuator 932 is configured to control a flow of the first and second fluids from the first and second flow passages 934, 936 to the fourth flow passage 940. In a divert mode of operation, the valve actuator 932 is configured to control a flow of the first fluid from the first flow passage 934 to the fourth flow passage 940, and a flow of the second fluid from the second flow passage 936 to the third flow passage 938. In particular, when the valve actuator 932 is in a first or open state, the first and second flow passages 934, 936 are in fluid communication with the fourth flow passage 940. When the valve actuator 932 is in a second or closed state, the first flow passage 934 is in fluid communication with the fourth flow passage 940, and is prevented from fluidly communicating with the second and third flow passages 936, 938. Likewise, when the valve actuator 932 is in the second or closed state, the second flow passage 936 is in fluid communication with the third flow passage 938, and is prevented from fluidly communicating with the first and fourth flow passages 934, 940.

The valve actuator 932 includes a diaphragm 960 and an actuation member 962. The diaphragm 960 is disposed at the second end 944 of the valve body 930, and includes an inner portion 960a, an intermediate portion 960b disposed radially outward from the inner portion 960a, and an outer portion 960c disposed radially outward from the intermediate portion 960b. The outer portion 960c may define a peripheral edge 964 of the diaphragm. In some configurations, the diaphragm 960 may include a generally circular shape, such that the peripheral edge 964 generally defines a circle. In an assembled configuration, the outer portion 960c is sealingly engaged with the second end 944 of the valve body 930. In particular, the outer portion 960c may be sealing engaged with the second end 944 of the valve body 930 at a location radially outward from the second, fourth, and sixth ports 948, 952, 956. The intermediate portion 960b is radially aligned with the second and sixth ports 948, 956. The inner portion 960a is radially aligned with the fourth port 952.

With reference to FIG. 12, the valve manifold 928 includes a fifth, sixth, seventh, and eighth flow passages 966, 968, 970, 972. The fifth flow passage 966 is in fluid communication with the first flow passage 934. The sixth flow passage 968 is in fluid communication with the second flow passage 936. The seventh flow passage 970 is in fluid communication with the third flow passage 938. The eighth flow passage 972 is in fluid communication with the fourth flow passage 940.

A method of operating the gas delivery assembly 900 will now be described with reference to FIGS. 12, 14A, 14B, and 15. The method may include a continuous cycle of at least three modes of operation, including a divert mode, a supply mode, and a standby mode. In this regard, the divert mode may precede the supply mode, the supply mode may precede the standby mode, and the standby mode may precede the divert mode. In the divert mode, vaporized precursor may be used to replace stale precursor in the second and/or third flow passages 936, 938. In the supply mode, vaporized precursor is supplied to the processing chamber. In the standby mode, vaporized precursor is not supplied and is not diverted.

Figure 15:
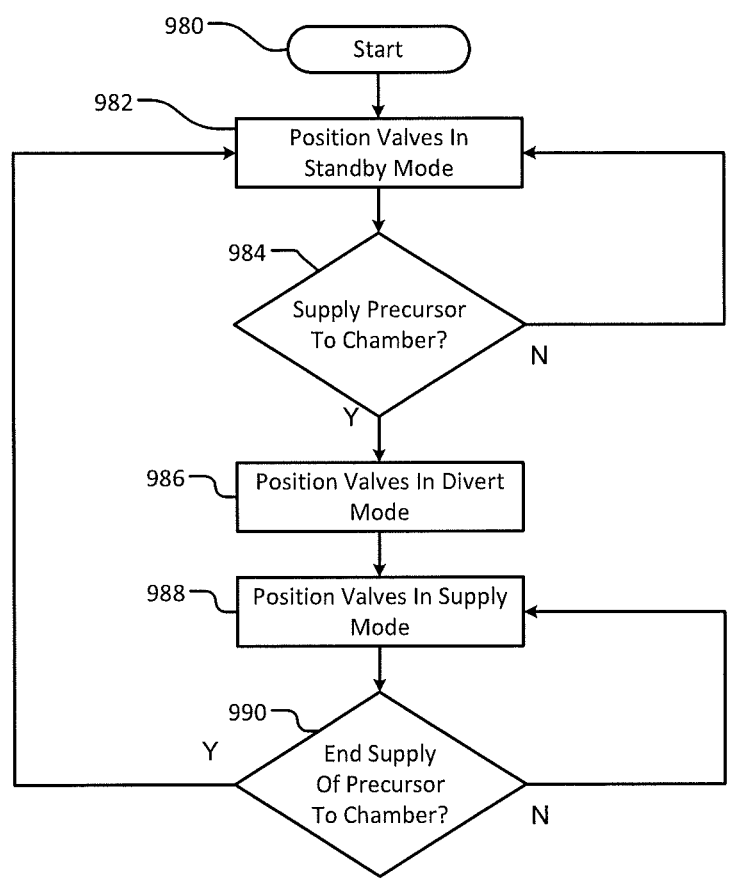
FIG. 15 is a flowchart depicting an example of a method for eliminating a deadleg volume in a valve manifold assembly according to the present disclosure.

As shown in FIG. 15, the method begins at 980. At 982, the valve assembly 920 is in a closed state (FIG. 14B). For example, the actuation member 962 may be pneumatically or electronically controlled to close the fourth port 952. In this regard, the diaphragm 960 abuts or otherwise sealingly engages the second end 944 of the valve body 930. The inner portion 960a of the diaphragm 960 may sealingly engage the second end 944 of the valve body 930 to prevent the second and third flow passages 936, 938 from fluidly communicating with the fourth flow passage 940. In the standby mode of operation, the intermediate portion 960b of the diaphragm 960 and the second end 944 of the valve body 930 define a chamber 976 having an annular configuration. Accordingly, during the standby mode, vaporized precursor gas will stagnate within the second flow passage 936 of the valve body 930.

At 984, the method determines whether or not vaporized precursor needs to be supplied to the substrate processing chamber. If 984 is false, the method returns to 982. If 984 is true, the method proceeds to the divert mode of operation at 986, and the valve assembly 920 remains in the closed state.

During the divert mode, the first flow passage 934 supplies a first fluid (e.g., purge gas) to the chamber 976, and the chamber 976 supplies the first fluid to the fourth flow passage 940. The second flow passage 936 supplies a second fluid (e.g., vaporized precursor gas) to the third flow passage 938, and is isolated from the fourth flow passage 940. The fourth flow passage 940 may supply the first fluid to various locations within the substrate processing system, such as the processing chamber. The third flow passage 938 supplies, or otherwise diverts, the second fluid to various locations inside, or out of, the substrate processing system (e.g., divert valve assembly 720-1 in FIG. 9). In this regard, during the divert mode of operation, the fluid supplied by the second flow passage 936 removes stagnant vaporized precursor from the third flow passage 938.

The method continues to 988 where the valve assembly 920 is opened (FIG. 14A) in the supply mode of operation. For example, the actuation member may be pneumatically or electronically controlled to open the fourth port 952. In this regard, the inner and central portions 960a, 960b of the diaphragm 960 are spaced apart from the second end 944 of the valve body 930. Accordingly, during the supply mode of operation, the first, second, third, fourth, fifth, sixth, seventh, and eighth flow passages 934, 936, 938, 940, 966, 968, 970, 972 are in fluid communication with the chamber 976. The first and/or second flow passage 934, 936 may supply fluid to the chamber 976 and to the fourth flow passage 940. From the fourth flow passage 940, the fluid can be directed to various locations within the substrate processing system, such as the processing chamber 502 (FIG. 7).

At 990, the method determines whether or not to end the supply of vaporized precursor to the substrate processing chamber. If 990 is false, the method returns to 988 where the valve assembly 920 remains in the supply mode of operation. If 990 is true, the method returns to 982 where the valve assembly 920 is positioned in the standby mode of operation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In some implementations, a controller is part of a system, which may be part of the above-described examples. Such systems can comprise semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. A gas delivery system for a substrate processing system, the gas delivery system comprising:
    a first gas channel;
    a cylinder defining a second gas channel having a first end and a second end,
    the cylinder at least partially disposed within the first gas channel such that the cylinder and the first gas channel collectively define a flow channel between an outer surface of the cylinder and an inner surface of the first gas channel,
    the flow channel is in fluid communication with the first end of the second gas channel;
    a third gas channel in fluid communication with the second end of the second gas channel,
    wherein the first end of the second gas channel is in fluid communication with the first gas channel such that gas provided to an inlet of the first gas channel flows through the flow channel defined between the outer surface of the cylinder and the inner surface of the first gas channel, through the second gas channel from the first end to the second end, and into the third gas channel;
    a first valve having an inlet and an outlet, wherein the outlet of the first valve is in fluid communication with a processing chamber of the substrate processing system; and
    a second valve having an inlet and an outlet,
    wherein the first gas channel is in fluid communication with a gas supply,
    wherein the flow channel is in fluid communication with the inlet of the first valve, and
    wherein the third gas channel is in fluid communication with the inlet of the second valve.

2. The gas delivery system of claim 1, wherein the gas supply includes a source of vaporized precursor.

3. The gas delivery system of claim 1, wherein the cylinder is concentrically disposed within the first gas channel.

4. The gas delivery system of claim 1, further comprising a heater configured to heat the flow channel.

5. The gas delivery system of claim 1, wherein the outer surface of the cylinder includes first and second radially outwardly extending projections, and wherein the first and second projections define a gap in fluid communication with the first and second gas channels.

6. The gas delivery system of claim 1, further comprising a controller configured to:
    operate in a standby mode, wherein the first and second valves prevent a vaporized precursor from flowing through the first and second valves;
    operate in a divert mode, wherein the first and second valves direct the vaporized precursor through the second and third gas channels and the second valve; and
    operate in a supply mode, wherein the first and second valves direct the vaporized precursor through the first gas channel and the first valve.

7. The gas delivery system of claim 1, further comprising a controller configured to:
    close the first and second valves to prevent a vaporized precursor from flowing through the first and second valves from the gas supply;
    close the first valve and open the second valve to divert the vaporized precursor through the second valve from the gas supply; and
    close the second valve and open the first valve to supply the vaporized precursor through the first valve from the gas supply, wherein the first valve is configured to supply the vaporized precursor to the processing chamber.

8. The gas delivery system of claim 1, wherein the second valve is operable to divert a flow of fluid away from the inlet of the first valve.

9. The gas delivery system of claim 8, further comprising a controller configured to open and close the first and second valves, wherein the controller is configured to close the first valve and open the second valve in a first mode of operation, wherein the controller is configured to open the first valve and close the second valve in a second mode of operation, and wherein the controller is configured to close the first and second valves in a third mode of operation.

10. The gas delivery system of claim 1, wherein the first gas channel includes a port sealingly engaged with the cylinder.

11. The gas delivery system of claim 10, wherein the first valve includes a valve seat, and wherein the first end of the second gas channel is disposed upstream of the valve seat and downstream of the port.

12. A gas delivery system for a substrate processing system, the gas delivery system comprising:
    a first gas channel;
    a cylinder defining a second gas channel having a first end and a second end,
    the cylinder at least partially disposed within the first gas channel such that the cylinder and the first gas channel collectively define a flow channel between an outer surface of the cylinder and an inner surface of the first gas channel,
    the flow channel is in fluid communication with the first end of the second gas channel;
    a third gas channel in fluid communication with the second end of the second gas channel,
    wherein the first end of the second gas channel is in fluid communication with the first gas channel such that gas provided to an inlet of the first gas channel flows through the flow channel defined between the outer surface of the cylinder and the inner surface of the first gas channel, through the second gas channel from the first end to the second end, and into the third gas channel; and a valve assembly coupled to at least one of the first gas channel, the second gas channel, and the third gas channel, the valve assembly comprising:
 a first flow passage configured to fluidly communicate with a first gas supply;
 a second flow passage configured to fluidly communicate with a second gas supply;
 a third flow passage extending from the second flow passage to a first outlet;
 a fourth flow passage in fluid communication with the first flow passage and configured to fluidly communicate with a processing chamber of the substrate processing system; and
 a valve actuator including a diaphragm moveable between an open position and a closed position, wherein the second flow passage is in fluid communication with the third flow passage in the closed position, and wherein the second flow passage is in fluid communication with the fourth flow passage in the open position.

13. The gas delivery system of claim 12, wherein the second gas supply includes a source of vaporized precursor.

14. The gas delivery system of claim 12, wherein the diaphragm is operable to prevent fluid communication between the second flow passage and the fourth flow passage in the closed position.

15. The gas delivery system of claim 12, wherein the diaphragm is configured to:
 divert a flow of vaporized precursor from the second flow passage to the third flow passage in the closed position;
 supply a flow of vaporized precursor from the second flow passage to the fourth flow passage in the open position; and
 supply a flow of purge gas from the first flow passage to the fourth flow passage in the open and closed positions.

16. The gas delivery system of claim 12, further comprising a controller configured to open and close the diaphragm.

17. The gas delivery system of claim 16, wherein the controller is configured to close the diaphragm in first and second modes of operation, and wherein the controller is configured to open the diaphragm in a third mode of operation.

18. The gas delivery system of claim 12, wherein the second flow passage includes an inlet and a second outlet, and wherein the third flow passage extends from the first outlet to the second outlet.

19. The gas delivery system of claim 18, wherein the diaphragm is configured to sealingly engage the second outlet.

20. A gas delivery system for a substrate processing system, the gas delivery system comprising:
 a first gas channel;
 a cylinder defining a second gas channel having a first end and a second end,
 the cylinder at least partially disposed within the first gas channel such that the cylinder and the first gas channel collectively define a flow channel between an outer surface of the cylinder and an inner surface of the first gas channel,
 the flow channel is in fluid communication with the first end of the second gas channel;
 a third gas channel in fluid communication with the second end of the second gas channel,
 wherein the first end of the second gas channel is in fluid communication with the first gas channel such that gas provided to an inlet of the first gas channel flows through the flow channel defined between the outer surface of the cylinder and the inner surface of the first gas channel, through the second gas channel from the first end to the second end, and into the third gas channel; and
 a valve assembly coupled to at least one of the first gas channel, the second gas channel, and the third gas channel, the valve assembly comprising:
 a valve actuator; and
 a valve body coupled to the valve actuator, the valve body extending from a first end to a second end, the first end including first, second, third, and fourth ports, the second end including fifth, sixth and seventh ports, the first port is in fluid communication with the fifth port through a first flow passage, the second port is in fluid communication with the sixth port through a second flow passage, the third port is in fluid communication with the sixth port through a third flow passage, the fourth port is in fluid communication with the seventh port through a fourth flow passage,
 wherein the fourth flow passage is configured to fluidly communicate with a processing chamber of the substrate processing system.

21. The gas delivery system of claim 20, wherein the first and fourth flow passages are disposed radially outward from the second and third flow passages.

22. The gas delivery system of claim 20, wherein the valve actuator is configured to:
 divert a flow of vaporized precursor from the second flow passage to the third flow passage in a closed position;
 supply a flow of vaporized precursor from the second flow passage to the fourth flow passage in an open position; and
 supply a flow of purge gas from the first flow passage to the fourth flow passage in the open and closed positions.

23. The gas delivery system of claim 20, wherein the valve actuator includes a diaphragm sealingly engaged with the second end of the valve body, the diaphragm configured to sealingly engage the sixth port such that the diaphragm and the second end of the valve body define a chamber.

24. The gas delivery system of claim 23, wherein the chamber includes an annular configuration.

25. The gas delivery system of claim 24, wherein the first and fourth flow passages are in fluid communication with the processing chamber, and the second flow passage is in fluid communication with the third flow passage.

26. A gas delivery system for a substrate processing system, the gas delivery system comprising:
 a first gas channel in fluid communication with a first gas supply;
 a cylinder defining a second gas channel having an inlet end and an outlet end, the cylinder at least partially disposed within the first gas channel such that the cylinder and the first gas channel collectively define a flow channel between an outer surface of the cylinder and an inner surface of the first gas channel;
 a third gas channel having a first end in fluid communication with the flow channel and a second end in fluid communication with a second gas supply; and
 a fourth gas channel extending from the first gas channel, the fourth gas channel in fluid communication with the outlet end of the second gas channel,
 wherein the inlet end of the second gas channel is configured to receive a first flow from the first gas supply and a second flow from the second gas supply, wherein the inlet end of the second gas channel is in fluid communication with the first gas channel such that gas provided to an inlet of the first gas channel flows through the flow channel defined between the outer surface of the cylinder and the inner surface of the first gas channel, through the second gas channel from the inlet end to the outlet end, and into the fourth gas channel.

27. The gas delivery system of claim 26, wherein the first gas supply includes a source of remote plasma clean gas.

28. The gas delivery system of claim 26, wherein the second gas supply includes a source of purge gas.

29. The gas delivery system of claim 26, wherein the cylinder is concentrically disposed within the first gas channel.

30. The gas delivery system of claim 26, further comprising a heater configured to heat the flow channel.

31. The gas delivery system of claim 26, wherein the outer surface of the cylinder includes first and second radially outwardly extending projections, and wherein the first and second projections define a gap in fluid communication with the first and third gas channels.

32. The gas delivery system of claim 26, further comprising:
a valve in fluid communication with the first gas channel; and
a controller configured to:
close the valve to prevent a remote plasma clean gas from flowing through the second gas channel from the first gas supply; and
open the valve to supply the remote plasma clean gas through the second gas channel from the first gas supply.

33. The gas delivery system of claim 26, further comprising a valve in fluid communication with the first gas channel, the valve being operable in an open position to permit a flow of gas from the first gas supply to enter the inlet end of the cylinder, and a closed position to prevent a flow of gas from entering the inlet end of the cylinder.

34. The gas delivery system of claim 33, wherein the valve includes a valve seat, and wherein the inlet end of the second gas channel is disposed downstream of the valve seat.

* * * * *